US012637129B2

(12) United States Patent
Freeland et al.

(10) Patent No.: US 12,637,129 B2
(45) Date of Patent: May 26, 2026

(54) APPARATUS AND SYSTEM AND/OR METHOD FOR BRAKING A SHOPPING CART

(71) Applicants: Nathan Freeland, Cambridge (CA);
David Freeland, Cambridge (CA)

(72) Inventors: Nathan Freeland, Cambridge (CA);
David Freeland, Cambridge (CA)

( * ) Notice: Subject to any disclaimer, the term of this patent is extended or adjusted under 35 U.S.C. 154(b) by 269 days.

(21) Appl. No.: 18/264,312

(22) PCT Filed: Feb. 5, 2021

(86) PCT No.: PCT/CA2021/050126
§ 371 (c)(1),
(2) Date: Aug. 4, 2023

(87) PCT Pub. No.: WO2022/165579
PCT Pub. Date: Aug. 11, 2022

(65) Prior Publication Data
US 2024/0059339 A1 Feb. 22, 2024

(51) Int. Cl.
*B62B 5/04* (2006.01)
*B62B 5/00* (2006.01)
*G01S 5/00* (2006.01)

(52) U.S. Cl.
CPC .......... *B62B 5/0423* (2013.01); *B62B 5/0096* (2013.01); *G01S 5/017* (2020.05)

(58) Field of Classification Search
CPC ... B62B 5/0006; B62B 5/0423; B62B 5/0096; G01S 5/017
(Continued)

(56) References Cited

U.S. PATENT DOCUMENTS 5,194,844 A * 3/1993 Zelda ................. G08B 13/1427
280/33.994
5,357,182 A * 10/1994 Wolfe ................ G08B 21/0216
280/DIG. 4
(Continued)

FOREIGN PATENT DOCUMENTS

CA 2051657 A1 8/1991
CA 2286808 10/1998
(Continued)

OTHER PUBLICATIONS

Gatekeeper Systems, Website, https://www.gatekeepersystems.com/us/.
Rocateq, Website, http://www.rocateq.com/usa/home/.

*Primary Examiner* — Hau V Phan
(74) *Attorney, Agent, or Firm* — Forsgren Fisher; James M. Urzedowski; Daniel A. Tysver

(57) ABSTRACT

Disclosed is an apparatus, system, and/or method for optimizing usage of a cart within a perimeter, the cart having one or more casters. The apparatus, system and/or method includes one or more beacons positionable within the perimeter and operable for one-way transmission of beacon data. A brake assembly, mountable on the one or more casters of the cart, uses a motion sensor to detect movement of the cart, a brake for arresting the motion of the cart, a scanner for receiving the beacon data transmitted from the one or more beacons; and a brake assembly processor for: (i) automatically applying a beacon algorithm to decode the beacon data; (ii) using the decoded beacon data to identify a beacon sequence as a locking signature condition or an unlocking signature condition and/or determine the location of the cart within the perimeter; and/or (iii) electronically receive and/or transmit the beacon data. The apparatus, system and/or method is operable to optimize the usage of the cart by engaging the brake if the decoded beacon data is identified (Continued)

as the locking signature condition or disengaging the brake if the decoded beacon data is identified as the unlocking signature condition.

26 Claims, 29 Drawing Sheets

(58) Field of Classification Search
USPC ...................................................... 280/33.994
See application file for complete search history.

(56) References Cited

U.S. PATENT DOCUMENTS

| | | | | |
|---|---|---|---|---|
| 5,831,530 | A * | 11/1998 | Lace | .................... G08B 13/181 |
| | | | | 340/568.5 |
| 6,502,669 | B1 * | 1/2003 | Harris | ................. B60B 33/0049 |
| | | | | 280/33.994 |
| 7,395,902 | B2 * | 7/2008 | D'Arca | .............. B60B 33/0092 |
| | | | | 188/69 |
| 7,397,373 | B2 | 7/2008 | Hunt | |
| 7,420,461 | B2 | 9/2008 | Nebolon | |
| 7,658,247 | B2 * | 2/2010 | Carter | ..................... B60L 58/15 |
| | | | | 180/65.24 |
| 7,857,108 | B2 * | 12/2010 | Amdahl | ................ B62B 5/0006 |
| | | | | 188/29 |
| 8,046,160 | B2 | 10/2011 | Carter | |
| 8,463,540 | B2 | 6/2013 | Hannah | |
| 8,602,176 | B2 * | 12/2013 | Khuu | .................. B60B 33/0094 |
| | | | | 188/19 |
| 9,606,238 | B2 | 3/2017 | Carter | |
| 9,610,965 | B2 | 4/2017 | Khuu | |
| 9,731,744 | B2 * | 8/2017 | Carter | ................. G01S 5/02685 |
| 9,758,185 | B2 | 9/2017 | Hannah | |
| 10,023,216 | B2 | 7/2018 | Hannah | |
| 10,189,494 | B2 | 1/2019 | Hannah | |
| 10,232,869 | B2 | 3/2019 | Carter | |
| 2005/0155824 | A1 * | 7/2005 | Taba | ....................... B60R 25/09 |
| | | | | 340/568.5 |
| 2008/0319625 | A1 * | 12/2008 | Hannah | .............. G08B 13/2434 |
| | | | | 280/33.994 |
| 2011/0023267 | A1 | 2/2011 | Qiu | |
| 2018/0257688 | A1 | 9/2018 | Carter | |
| 2020/0079412 | A1 * | 3/2020 | Ramanathan | ........ G06Q 20/202 |

FOREIGN PATENT DOCUMENTS

| | | |
|---|---|---|
| CA | 2297457 | 1/1999 |
| CA | 2495655 | 2/2004 |
| CA | 2604212 A1 | 11/2006 |
| CA | 2610241 A1 | 12/2006 |

* cited by examiner

Accel 10Hz

Beecon ID
& RSSI

Cart
Controller lock/unlock signal scan/no-scan signal cart usage (seconds)

601

Accel Data
ax, ay, az

Moving Average Filter
window = 1s

*motion*
signal

Integrator

Cart Usage

Block 1

602

Block 3: Scanning State Machine

Block 4:
Motion Tracker

Block 5: Lock/Unlock State Machine

605

Figure 11:
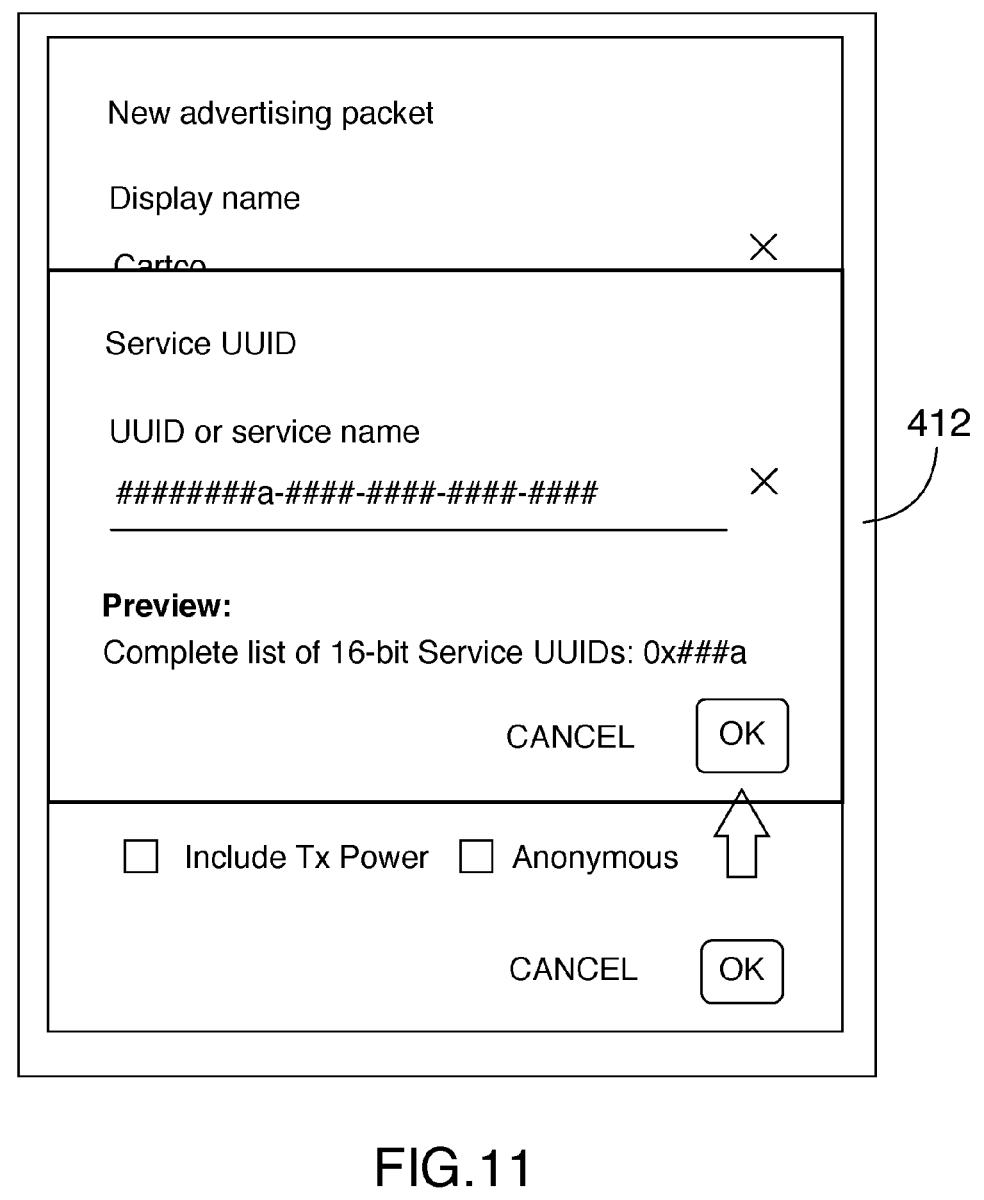

New advertising packet

Display name

Cartco                   ✕

Service UUID

UUID or service name

##a-####-####-####-####    ✕

Preview:
Complete list of 16-bit Service UUIDs: 0x###a

CANCEL    OK

412

☐ Include Tx Power    ☐ Anonymous

CANCEL    OK

Bluetooth Data (Scan: ON) → Block B1: Beacon Scanner → Beacon Name & RSSI (dB)

→ Nearest Beacon (Localization)

652

Accelerometer Data (10HZ) → Block B2: Cart Motion Analyzer → Instant Motion (1 or 0)

→ Cart Usage (minutes) 15 min

654

Magnetic Pulses → Block B3: Wheel Revolution Analyzer → Distance (meters)

656

658

Condition 1: Cart moves for 80cm, when the wheel is unlocked, or is shaken for 1 second, when the wheel is locked.

660

Block B6

APPARATUS AND SYSTEM AND/OR METHOD FOR BRAKING A SHOPPING CART

FIELD OF THE INVENTION

The present invention relates generally to a cart control system. In particular, the present invention relates to a system, method and/or computer readable medium for braking a shopping cart to optimize cart usage and/or minimize cart theft.

BACKGROUND OF THE INVENTION

Braking mechanisms are used to stop rotation of a rotating component where the rotating component may be part of machinery or a wheel. Brakes, for example, are used to stop or restrict motion of a vehicle by restricting rotation of a wheel of the vehicle. One use for brakes includes providing a mechanism for restricting or arresting motion of a shopping cart or dolly to reduce theft or other unauthorized movement of the shopping cart.

Braking systems on shopping carts can be used to reduce theft by wirelessly activating a brake on a particular shopping cart to restrict motion of the shopping cart. The brake is engaged and disengaged in response to wireless signals that may be transmitted from particular locations in a shopping area or building. When a cart passes near those locations under certain conditions, the brake is activated. For example, if an attempt is made to remove a cart from a store and the braking system has not been notified that exit from the store is authorized, the brake is activated when passing through the store exit where a wireless transmitter transmits a wireless signal. Conventional braking mechanisms for shopping carts and other vehicles, however, are limited in that they are often large and difficult and/or expensive to attach to existing vehicle designs. The large size may cause the cart to be difficult to maneuver. Further, many conventional systems include parts that are susceptible to wear and must be replaced or repaired which may add significant costs to maintaining the anti-theft system. In addition, conventional designs often require numerous moving parts, or burying wires in the ground to create a perimeter, resulting in increased cost and less reliability.

Common inexpensive casters may include a brake feature, which prevents the wheel from turning. This is commonly achieved using a lever that presses a brake cam against the wheel. However, a swivel caster is still able to move around slightly, in a small circle rotating around the offset distance between the vertical shaft and the center of the locked wheel.

In the prior art, different solutions have been developed for braking mechanisms for carts. The prior art attempts, however, may have been sub-optimal and costly.

As a result, there may be a need for, or it may be desirable to provide a system, method and computer readable medium for braking a shopping cart and/or cooperating environment that overcomes one or more of the limitations associated with the prior art.

SUMMARY OF THE INVENTION

The present disclosure provides a system, apparatus and/or method for braking a shopping cart.

According to a preferred embodiment, there is provided a system for optimizing the usage of a cart within a perimeter, the cart having one or more casters. The system includes one or more beacons positionable within the perimeter and operable for one-way transmission of beacon data, including beacon identification and/or beacon location. In addition, the system includes a brake assembly mountable on the one or more casters of the cart, the brake assembly including: a motion sensor for detecting movement of the cart and generating cart data associated with the movement of the cart. A brake for arresting the motion of the cart is also provided, along with a scanner for receiving the beacon data transmitted from the one or more beacons. A brake assembly processor is operable to: (i) automatically apply a beacon algorithm to decode the beacon data; (ii) using the decoded beacon data to identify the beacon sequence as a locking signature condition or an unlocking signature condition and/or determine the location of the cart within the perimeter; and/or (iii) electronically receive and/or transmit the cart data and the beacon data. Thus, according to the invention, the system is operable to optimize the usage of the cart by engaging the brake if the decoded beacon data is identified as the locking signature condition or disengaging the brake if the decoded beacon data is identified as the unlocking signature condition.

According to an aspect of a preferred embodiment of the invention, the system further includes one or more administrator processors operable to: (i) electronically receive the cart data and the beacon data from the brake assembly processor; (ii) automatically apply a motion detection and cart usage algorithm to the cart data and the beacon data to generate cart usage data and/or one or more reports associated with the cart. Thus, according to the invention, the system is operable to optimize the usage of the cart based on a review of the cart usage data and/or the one or more reports associated with the cart.

According to an aspect of a preferred embodiment of the invention, the system further includes one or more databases for electronically storing the cart data, the beacon data, the cart usage data and the one or more reports associated with the cart.

According to an aspect of a preferred embodiment of the invention, the motion sensor is adapted to activate a power-saving mode for the brake assembly if the cart is stationary for a predetermined amount of time.

According to an aspect of a preferred embodiment of the invention, the motion sensor is one of an accelerometer and a wheel rotation counter.

According to an aspect of a preferred embodiment of the invention, the system further includes a mobile application adapted to engage and/or disengage the brake independent of the decoded beacon data.

According to an aspect of a preferred embodiment of the invention, the reports include mileage history of the cart, lock history of the cart, consumer behaviour, battery voltage, and/or scanner status.

According to an aspect of a preferred embodiment of the invention, the brake includes a locking lever to facilitate locking and unlocking a wheel associated with the caster in cooperation with a locking plate connectable to the wheel. The locking lever is adapted to pivot about a locking lever pin between a lock position, such that a locking plate engagement end of the lever engages the locking plate to prevent rotation of the wheel, and an unlock position such that the locking plate engagement end of the lever disengages the locking plate to allow rotation of the wheel.

According to an aspect of a preferred embodiment of the invention, the brake further includes a cam, rotatable between a cam engagement position and a cam disengagement position, and a motor adapted to rotate the cam between the cam engagement position and the cam disengagement position, such that when the locking signature condition is identified, the motor rotates the cam to the disengagement position to disengage the cam from the locking lever to pivot the lever to the lock position, and when the unlocking signature condition is identified, the motor rotates the cam to the engagement position to engage the cam with the locking lever to pivot the lever to the unlock position.

According to an aspect of a preferred embodiment of the invention, the locking plate has a depression for receiving the locking plate engagement end of the lever to prevent further rotation of the locking plate in the lock position.

According to an aspect of a preferred embodiment of the invention, the brake further includes a resilient member for urging the locking lever into the lock position when the cam is in the disengagement position.

According to an aspect of a preferred embodiment of the invention, the identification of the locking signature condition and the unlocking signature condition includes the use of at least one of signal strength information, signal strength variation and/or transition state detection.

According to a preferred embodiment, a brake assembly is provided for arresting the motion of a cart having one or more casters. Each of the one or more casters has a wheel rotatably mounted on a shaft and the shaft supported by a fork pivotably connected to the cart. The brake assembly is mountable on the fork of at least one of the one or more casters and includes: a housing; one or more electronic components; a locking plate connectable to a first end of the shaft; a bearing housing mountable on a side of the fork opposite the housing and adapted to rotatably receive a second end of the shaft; a cam mounted on a portion of the housing and rotatable between a cam engagement position and a cam disengagement position; and a motor adapted to rotate the cam between the cam engagement position and the cam disengagement position. A locking lever is also included to facilitate locking and unlocking the wheel in cooperation with the cam and the locking plate, the locking lever adapted to pivot about a locking lever pin mounted to the housing between a lock position, such that a locking plate engagement end of the lever engages the locking plate to prevent rotation of the wheel, and an unlock position such that the locking plate engagement end of the lever disengages the locking plate to allow rotation of the wheel. Thus, according to the invention, when the one or more electronic components identify a locking signature condition, the motor rotates the cam to the disengagement position such that the cam is disengaged from the locking lever to pivot the lever to the lock position to prevent rotation of the wheel, and when the one or more electronic components identify an unlocking signature condition, the motor rotates the cam to the engagement position such that the cam engages the locking lever to pivot the lever to the unlock position to allow rotation of the wheel.

According to an aspect of a preferred embodiment of the invention, the locking plate has a depression for receiving the locking plate engagement end of the lever to prevent further rotation of the locking plate in the lock position.

According to an aspect of a preferred embodiment of the invention, a resilient member is included for urging the locking lever into the lock position when the cam is in the disengagement position.

According to an aspect of a preferred embodiment of the invention, a limit switch is included to define the limit of travel of the cam between the cam engagement position and the cam disengagement position.

According to an aspect of a preferred embodiment of the invention, the one or more electronic components includes a motion sensor for detecting movement of the cart and generating cart data associated with the movement of the cart.

According to an aspect of a preferred embodiment of the invention, the motion sensor is one of an accelerometer and a wheel rotation counter.

According to an aspect of a preferred embodiment of the invention, the one or more electronic components includes a scanner for locating the beacons.

According to an aspect of a preferred embodiment of the invention, the one or more electronic components further includes a processor operable to automatically apply a beacon algorithm to identify a beacon sequence and determine the locking signature condition or the unlocking signature condition.

According to a preferred embodiment, there is provided a method of optimizing usage of a cart within a perimeter, the cart having one or more casters. The method includes the steps of: (a) positioning one or more beacons within the perimeter, the one or more beacons operable for one-way transmission of beacon data, including beacon identification and/or beacon location; (b) providing a brake assembly mountable on the one or more casters of the cart, the brake assembly including: a motion sensor; a brake; a scanner; and a brake assembly processor; (c) detecting movement of the cart to generate cart data using the motion sensor; (d) activating the scanner when movement of the cart is detected; (e) receiving the beacon data transmitted by the one or more beacons; (f) decoding the beacon data using a brake assembly processor operable to apply a beacon algorithm to the beacon data and use the decoded beacon data to identify a beacon sequence and determine a locking signature condition or an unlocking signature condition; (g) electronically receiving and/or transmitting the cart data and the beacon data; and (h) engaging the brake if the decoded beacon data is identified as the locking signature condition or disengaging the brake if the decoded beacon data is identified as the unlocking signature condition.

According to an aspect of a preferred embodiment of the invention, the method further includes the steps of: (i) operating one or more administrator processors to electronically receive the cart data and the beacon data from the brake assembly processor; (ii) automatically applying a motion detection and cart usage algorithm to the cart data and the beacon data using the one or more administrator processors to generate cart usage data and/or one or more reports associated with the cart; and (iii) reviewing the cart usage data and/or the one or more reports associated with the cart to optimize the usage of the cart.

According to an aspect of a preferred embodiment of the invention, the method further includes a step of electronically storing the cart data, the beacon data, the cart usage data and the one or more reports associated with the cart in one or more databases.

According to an aspect of a preferred embodiment of the invention, the method further includes a step of activating a power-saving mode for the brake assembly if the motion sensor determines that the cart is stationary for a predetermined amount of time.

According to an aspect of a preferred embodiment of the invention, the operation of the brake further includes the steps of: (i) pivoting a locking lever having a locking plate engagement end, about a locking lever pin, between a lock position and an unlock position; and (ii) engaging the locking plate engagement end with a locking plate connectable to the wheel to prevent rotation of the wheel when the locking lever is in the lock position and disengaging the locking plate engagement end from the locking plate to allow rotation of the wheel when the locking lever is in the unlock position.

According to an aspect of a preferred embodiment of the invention, the operation of the brake further includes the steps of: (i) rotating a cam between a cam engagement position to engage the cam with the locking lever to pivot the lever to the unlock position and a cam disengagement position to disengage the cam from the locking lever to pivot the lever to the lock position; (ii) operating a motor to rotate the cam between the cam engagement position and the cam disengagement position; and (iii) rotating the cam to the disengagement position when the locking signature condition is identified and to the engagement position when the unlocking signature condition is identified.

According to an aspect of a preferred embodiment of the invention, there is provided a system for optimizing usage of a cart, having one or more casters, within a perimeter. The system includes one or more beacons positionable within the perimeter and operable for one-way transmission of beacon data, including beacon identification and/or beacon location. Also included is a brake assembly mountable on the one or more casters of the cart. The brake assembly includes a brake for arresting the motion of the cart and a brake assembly processor. The brake assembly processor is operable to: (i) receive the beacon data transmitted from the one or more beacons; (ii) automatically apply a beacon algorithm to decode the beacon data; and/or (iii) use the decoded beacon data to identify the beacon sequence as a locking signature condition or an unlocking signature condition and/or determine the location of the cart within the perimeter. The system is operable to optimize the usage of the cart by engaging the brake if the decoded beacon data is identified as the locking signature condition or disengaging the brake if the decoded beacon data is identified as the unlocking signature condition.

Other advantages, features and characteristics of the present invention, as well as methods of operation and functions of the related elements of the system, method and/or computer readable medium for optimizing cart usage and tracking, and the combination of steps, parts and economies of manufacture, will become more apparent upon consideration of the following detailed description and the appended claims with reference to the accompanying drawings, the latter of which are briefly described herein below.

BRIEF DESCRIPTION OF THE DRAWINGS

The novel features which are believed to be characteristic of the system, method and/or computer readable medium according to the present invention, as to their structure, organization, use, and method of operation, together with further objectives and advantages thereof, may be better understood from the following drawings in which presently preferred embodiments of the invention may now be illustrated by way of example. It is expressly understood, however, that the drawings are for the purpose of illustration and description only and are not intended as a definition of the limits of the invention. In the accompanying drawings.

6

Figure 1A:
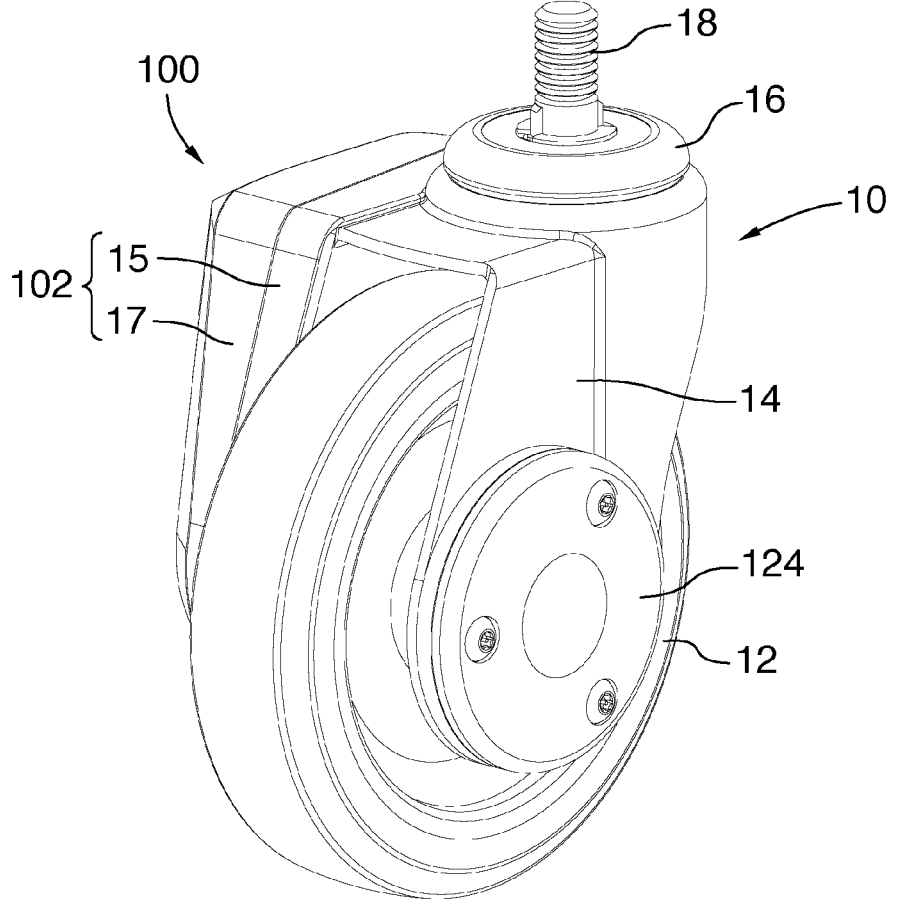
FIG. 1A is a right-hand perspective view of a caster and brake assembly in accordance with a preferred embodiment of the invention.
Figure 1B:
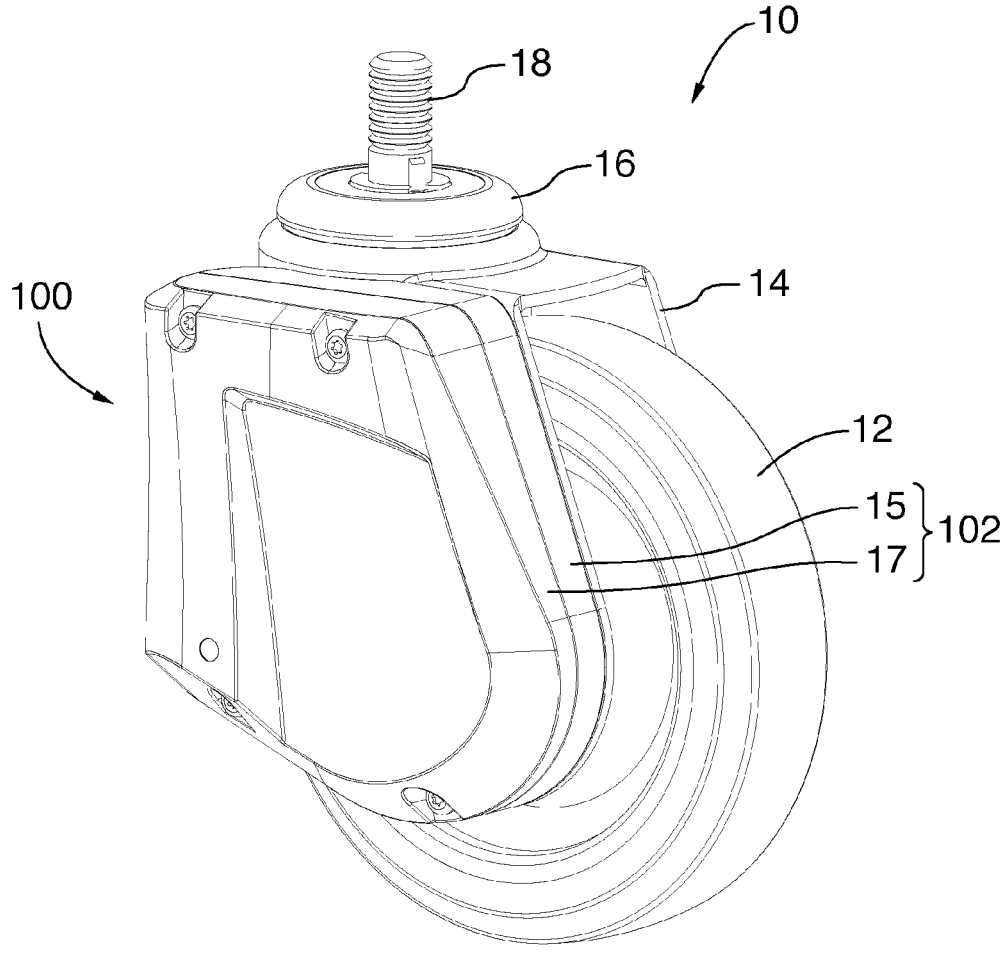
FIG. 1B is a left-hand perspective view of the caster and brake assembly shown in FIG. 1A.
Figure 1C:
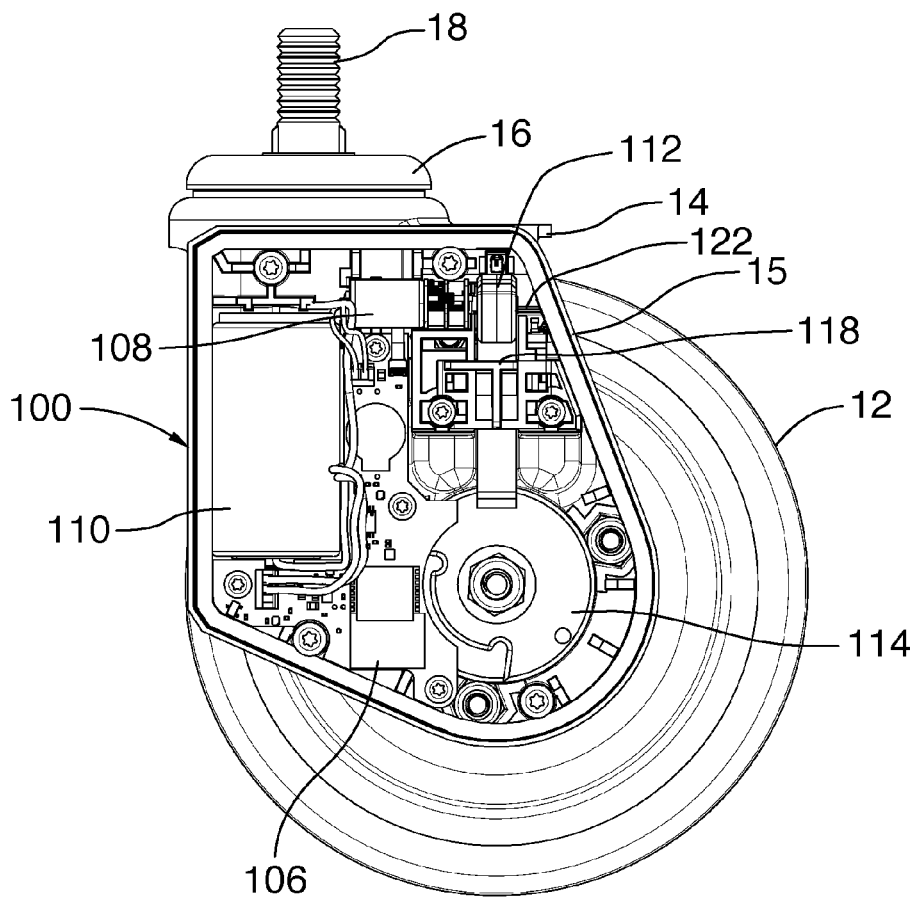
Figure 1D:
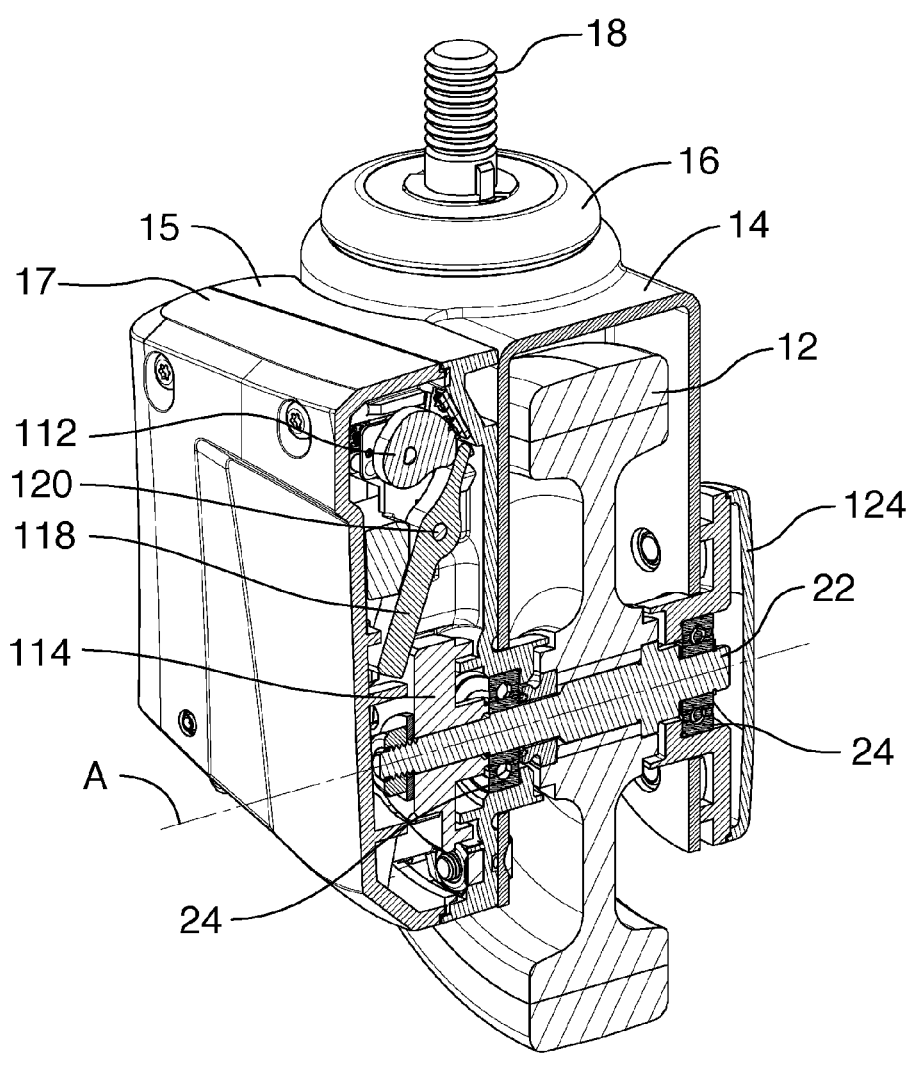
Figure 1E:
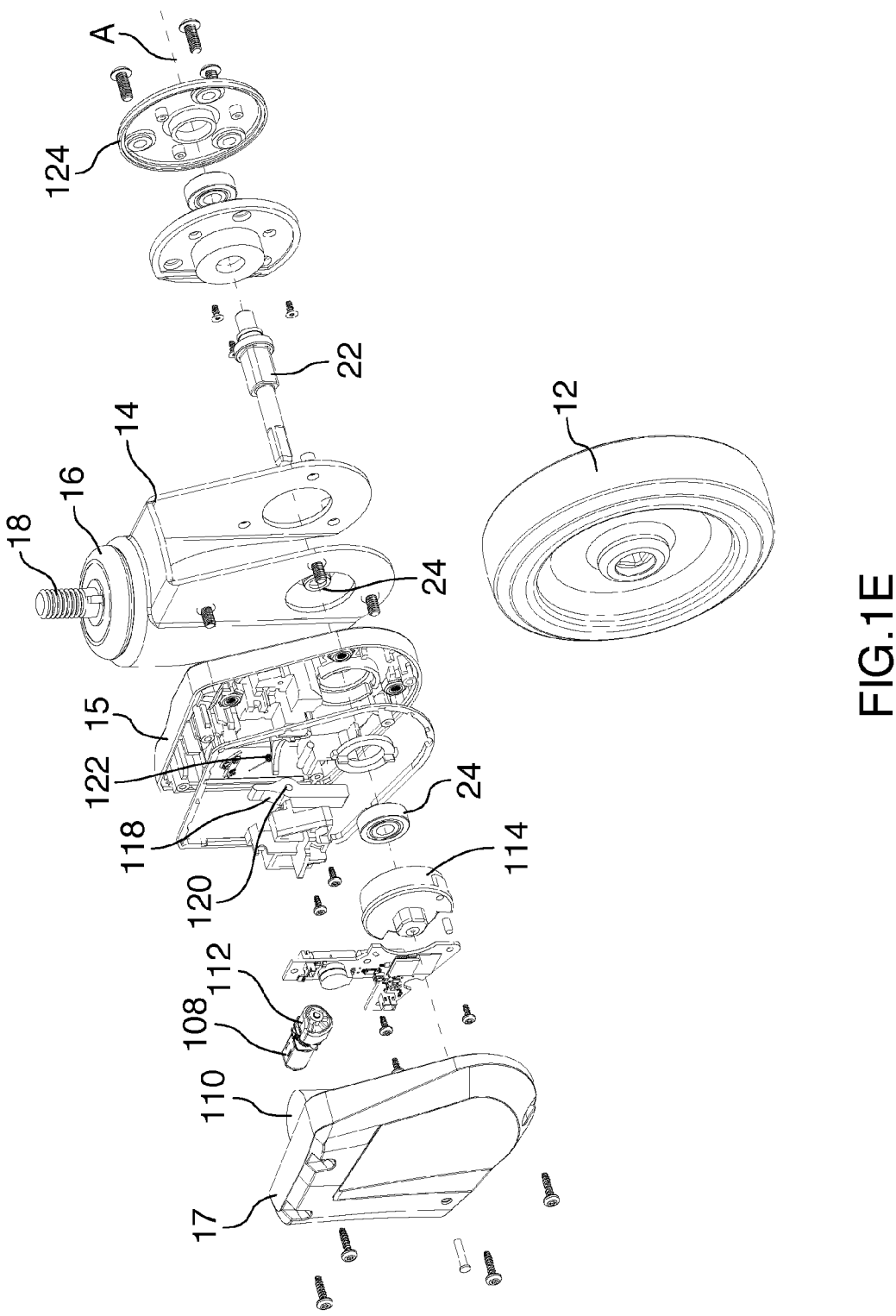
Figure 1F:
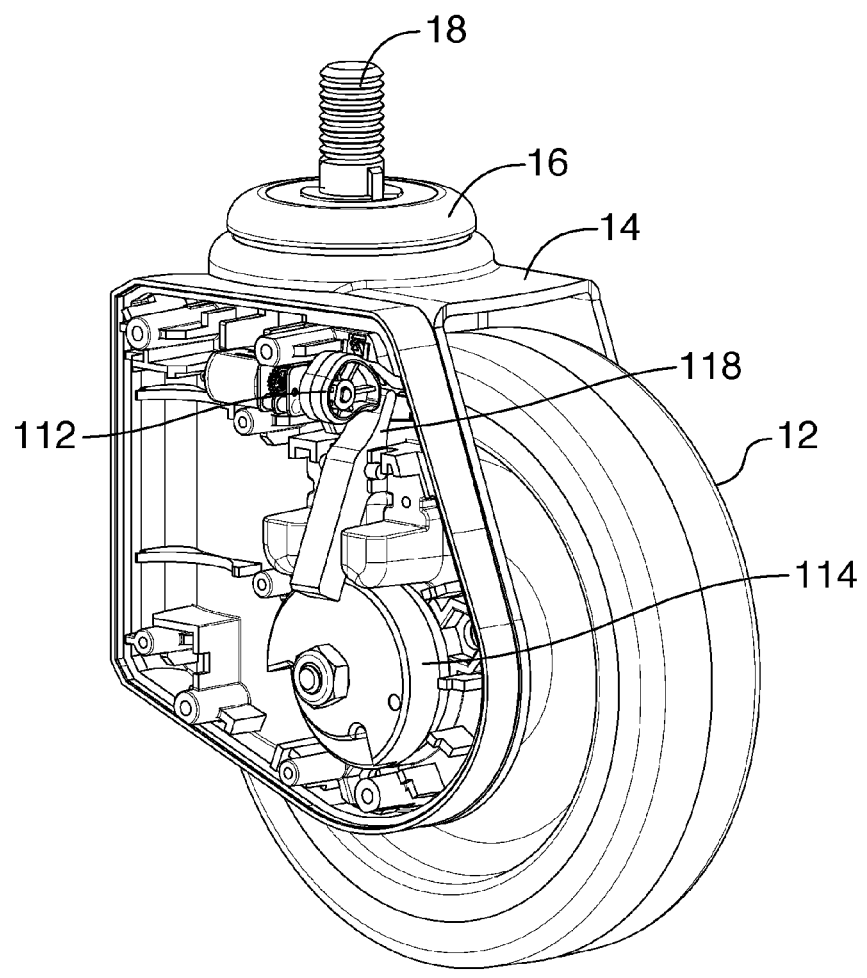
Figure 1G:
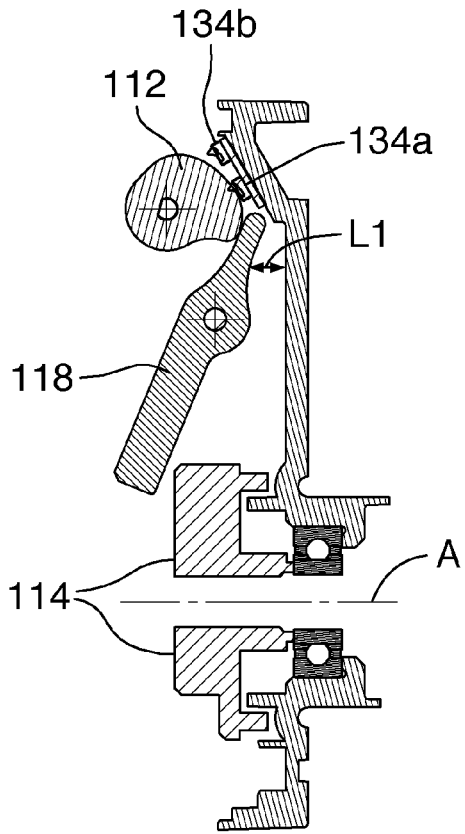
Figure 1H:
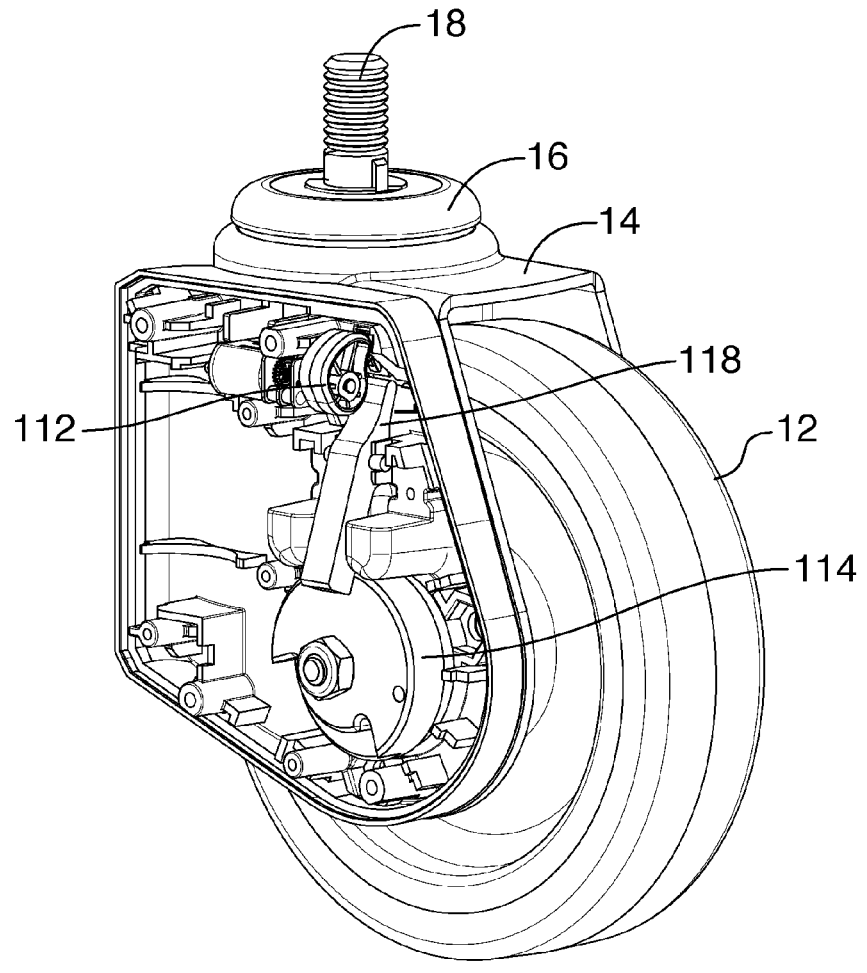
Figure 1I:
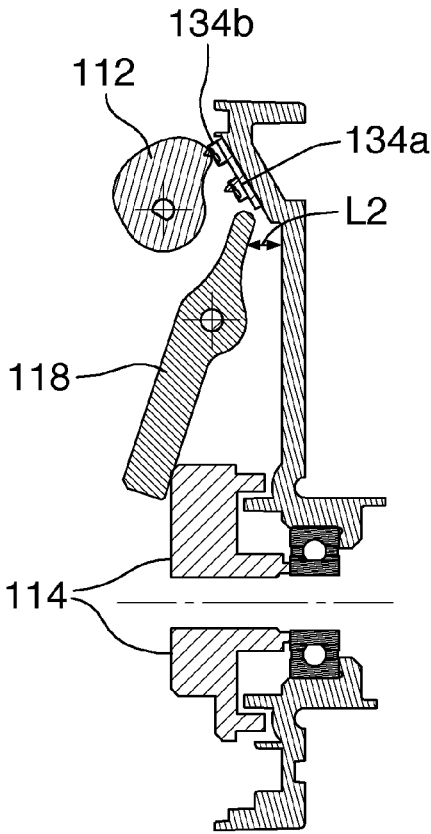
Figure 1J:
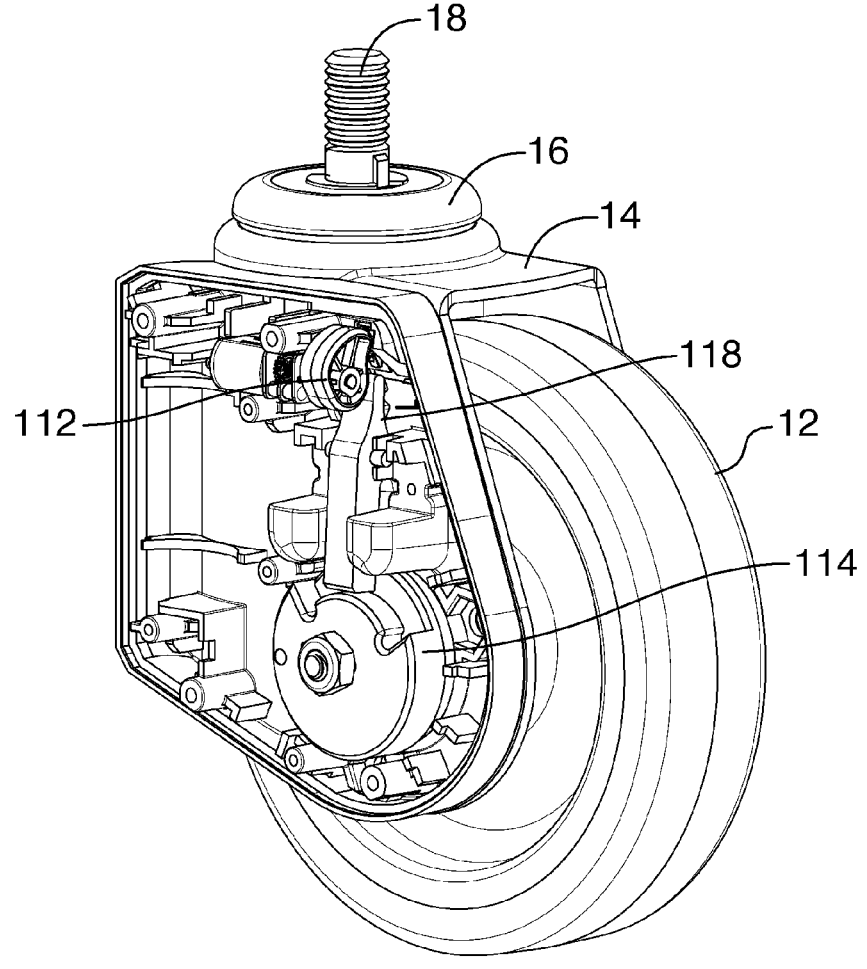
Figure 1K:
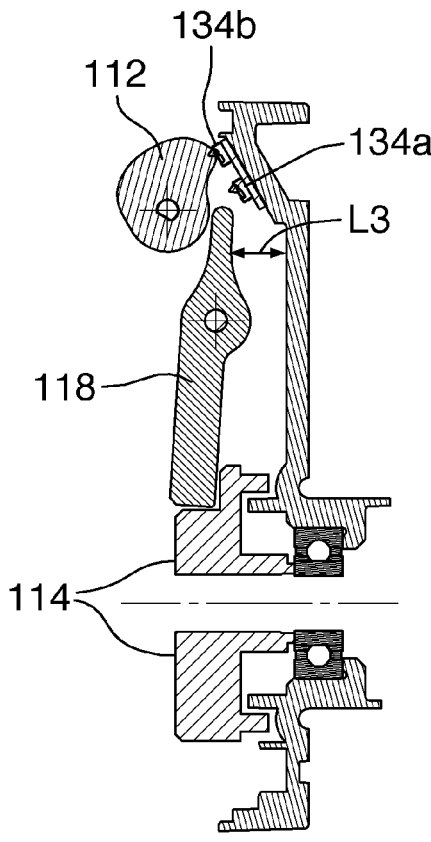
Figure 2:
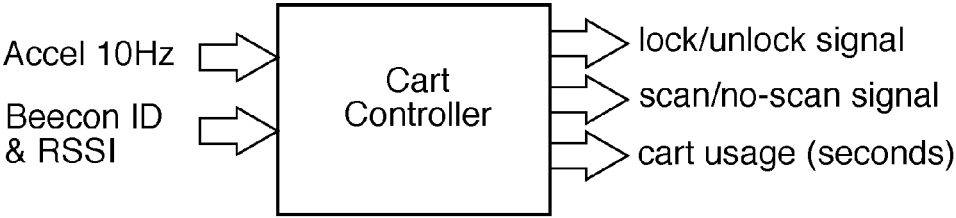
Figure 3:
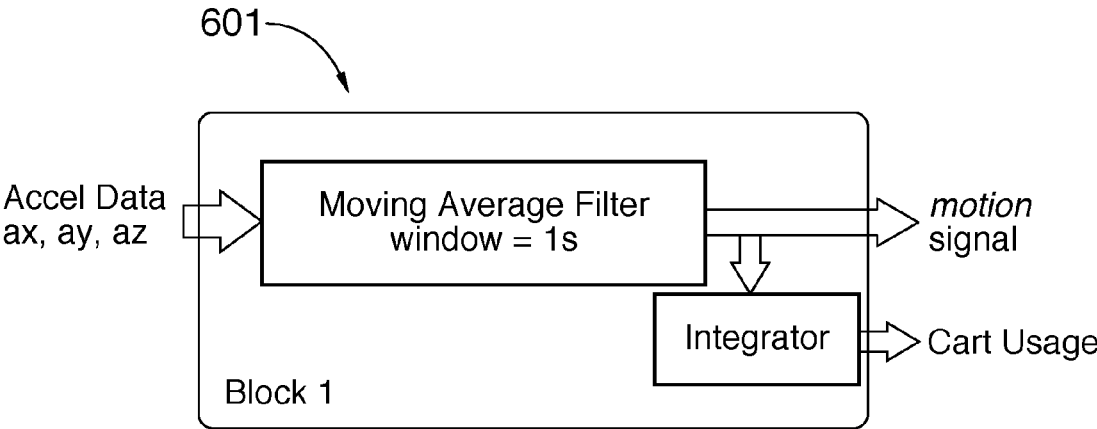
Figure 4:
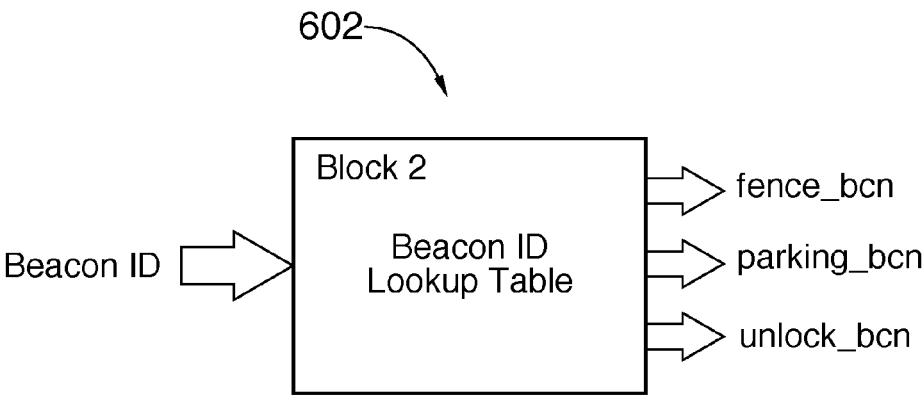
Figure 5:
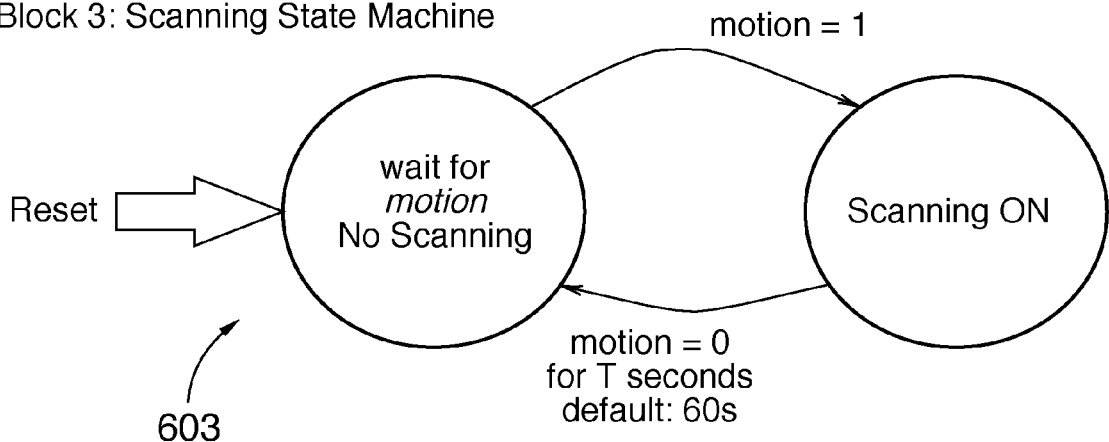
Figure 6:
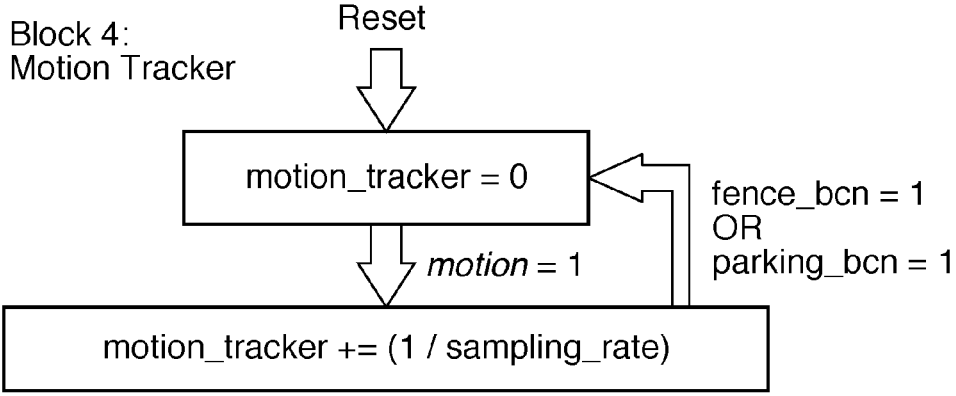
Figure 7:
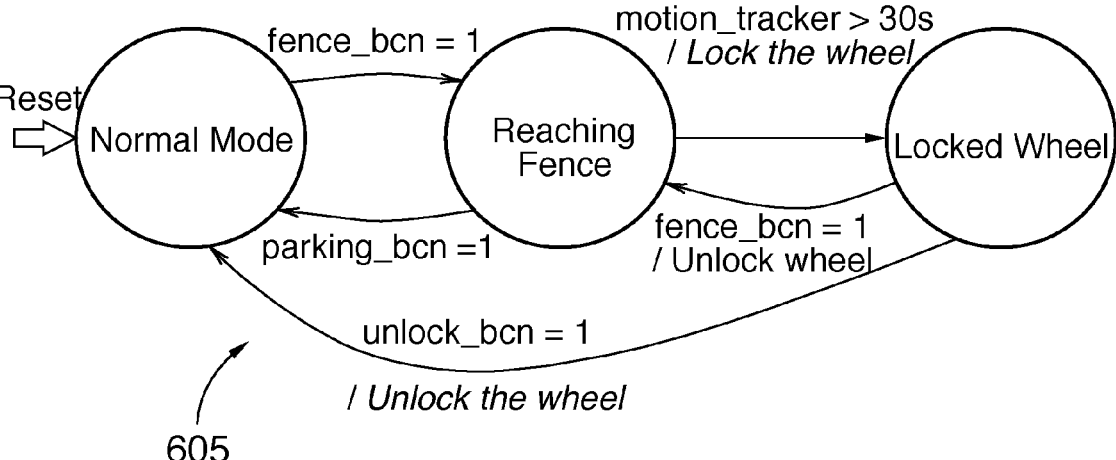
Figure 8:
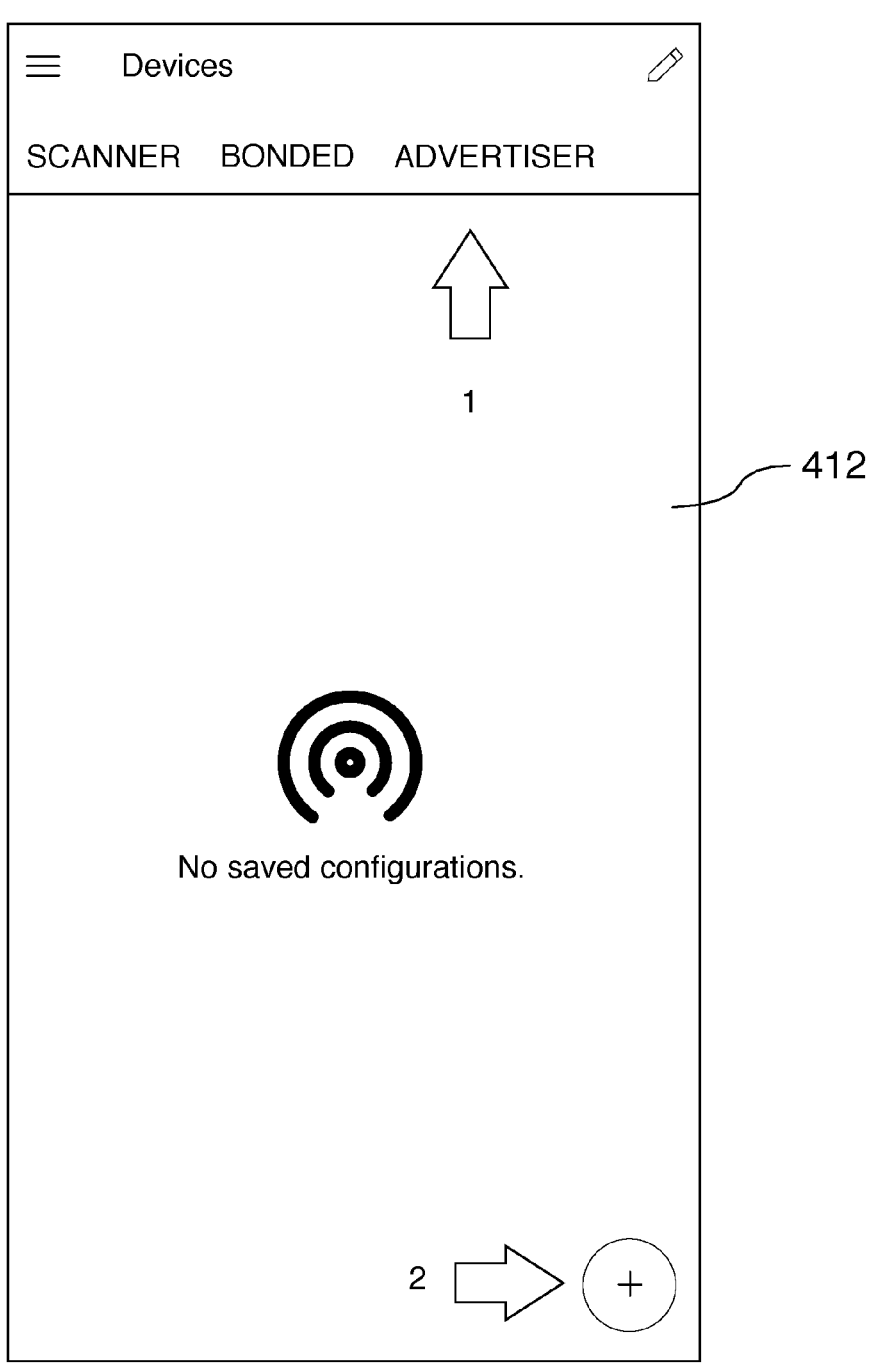
Figure 9:
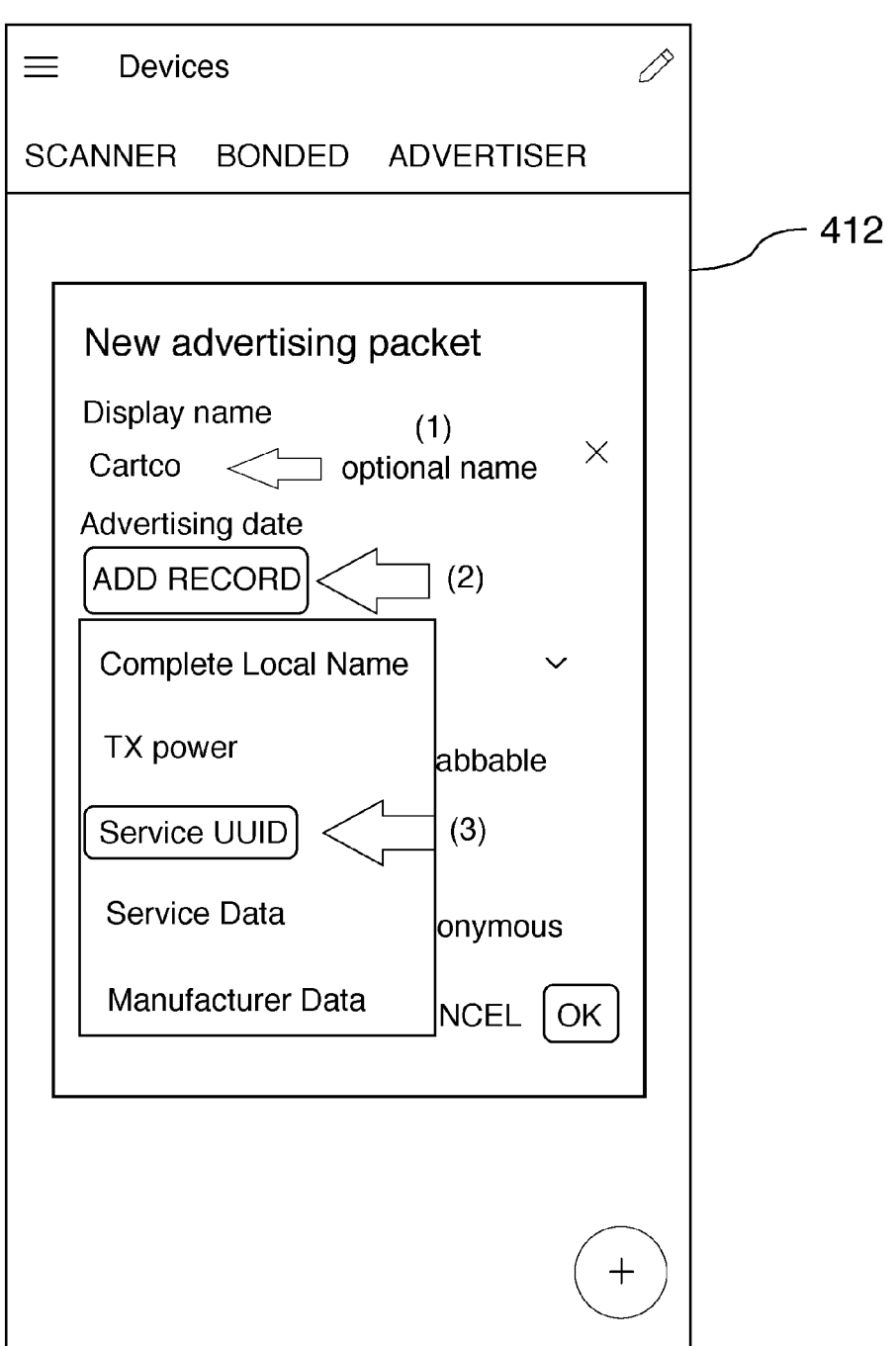
Figure 10:
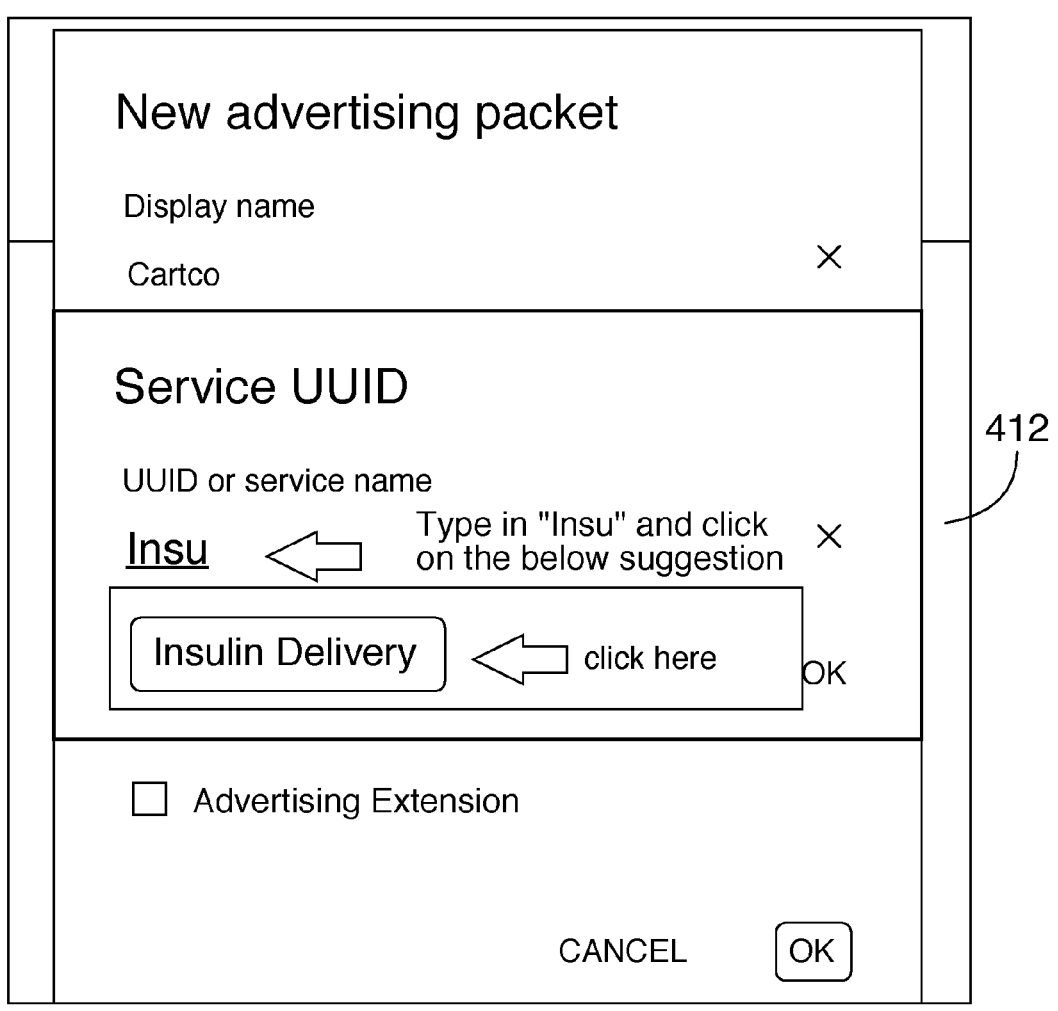
Figure 13:
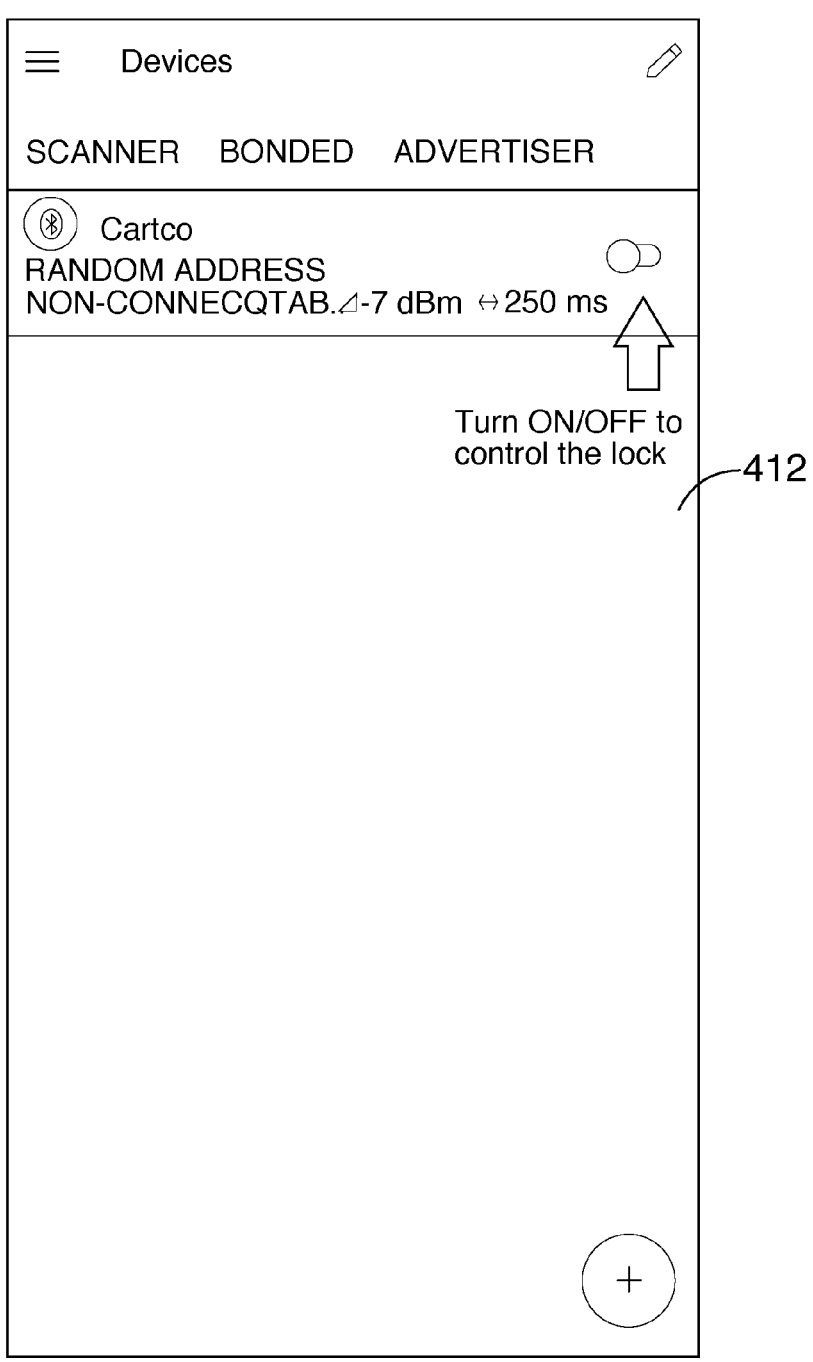
Figure 14:
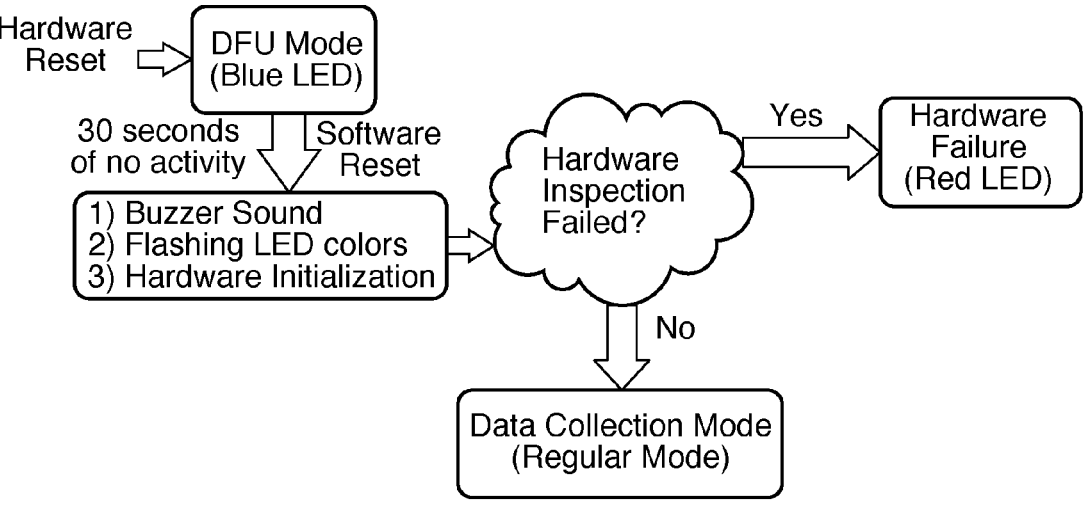
Figure 15:
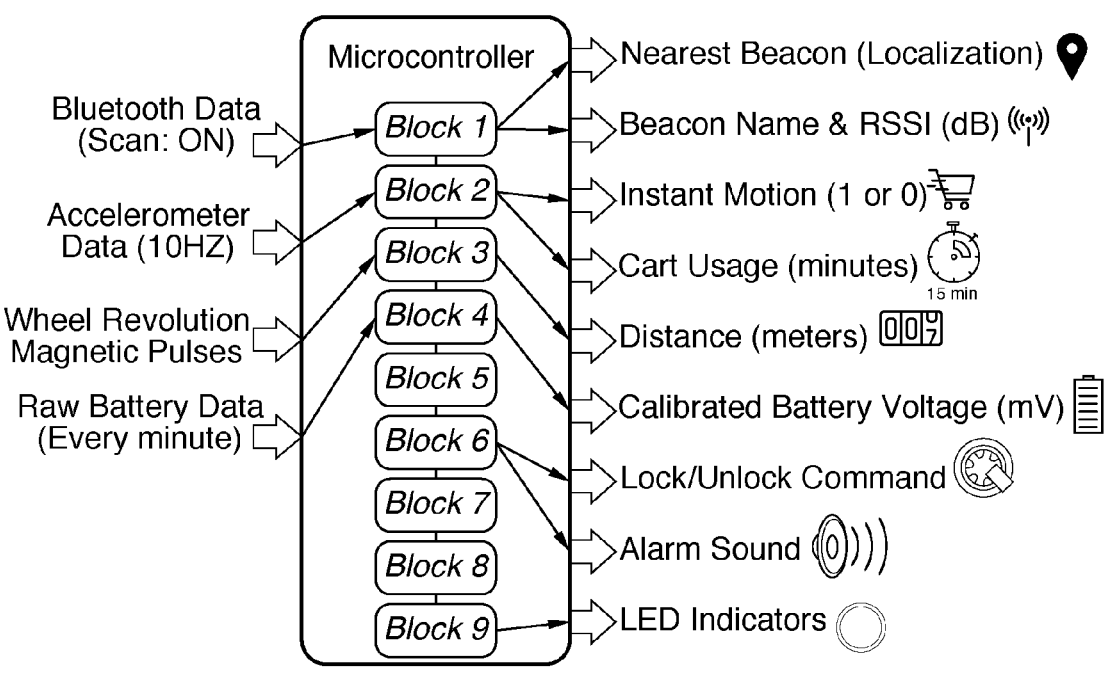
Figure 16:
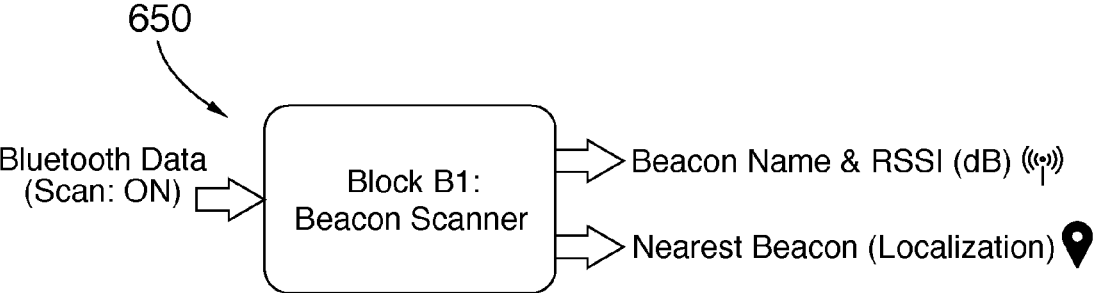
Figure 17:
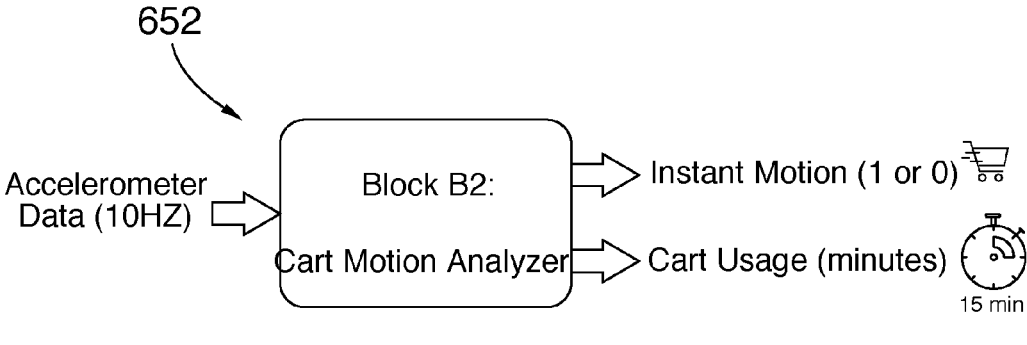
Figure 18:
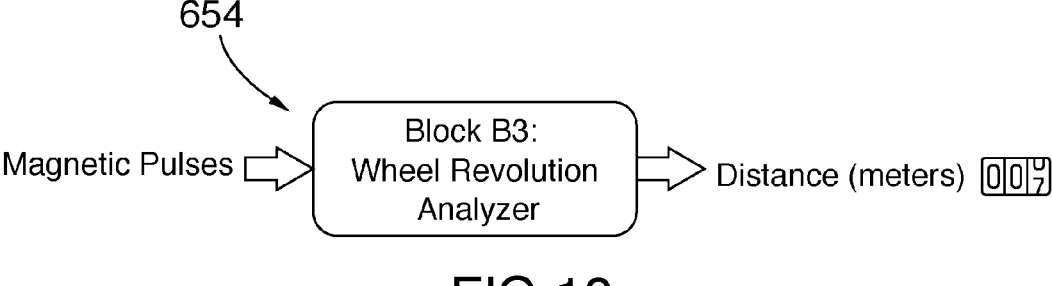
Figure 19:
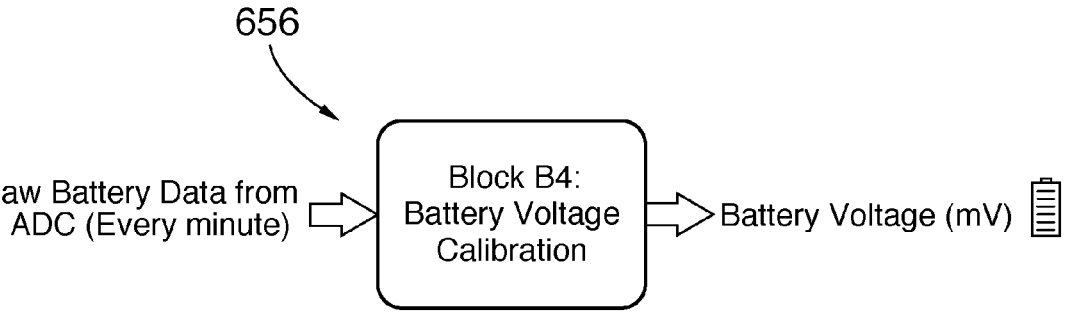
Figure 20:
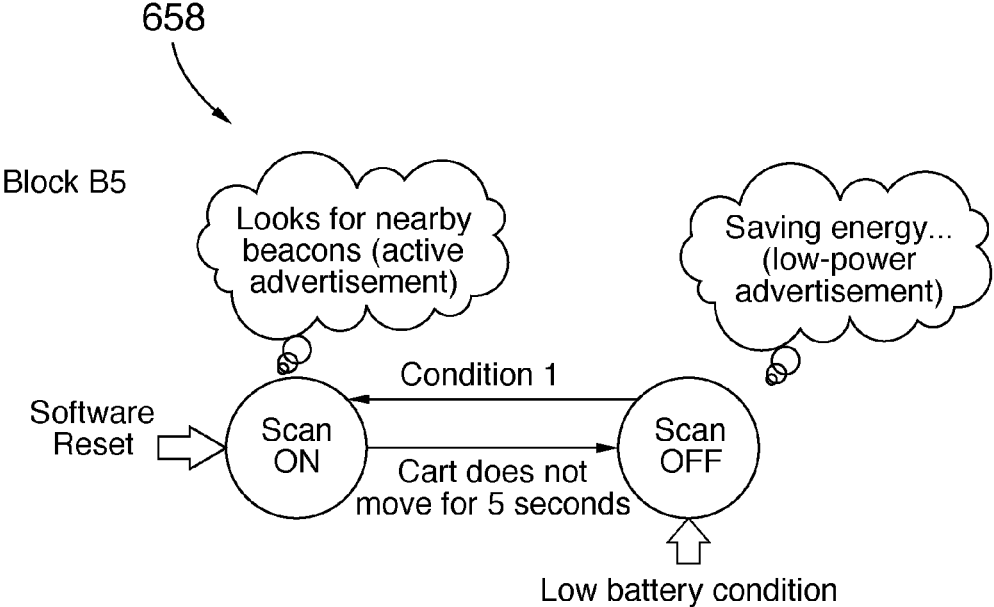
Figure 21:
Figure 21:
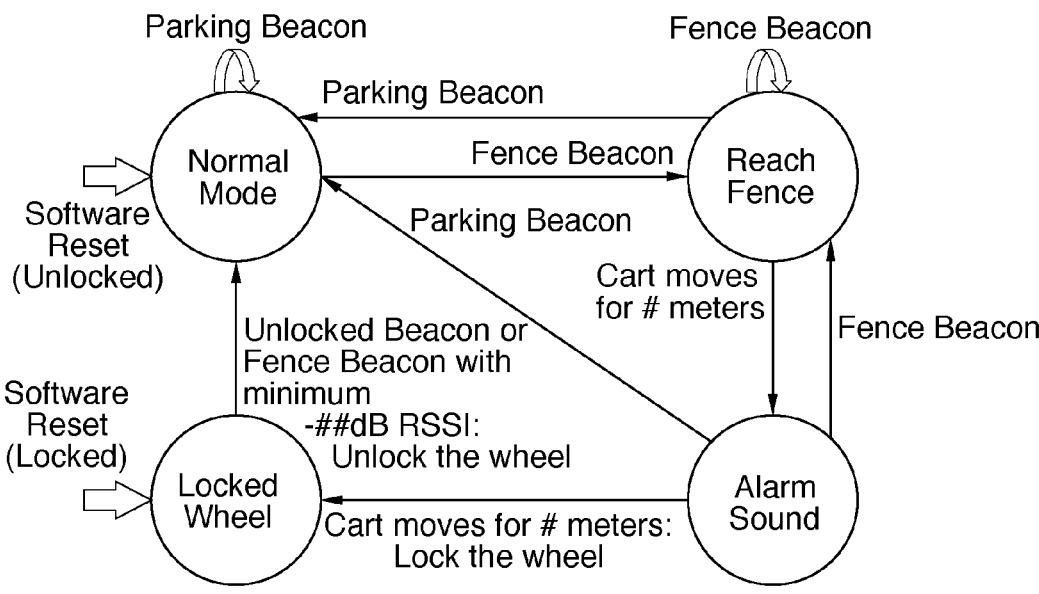
Figure 22:
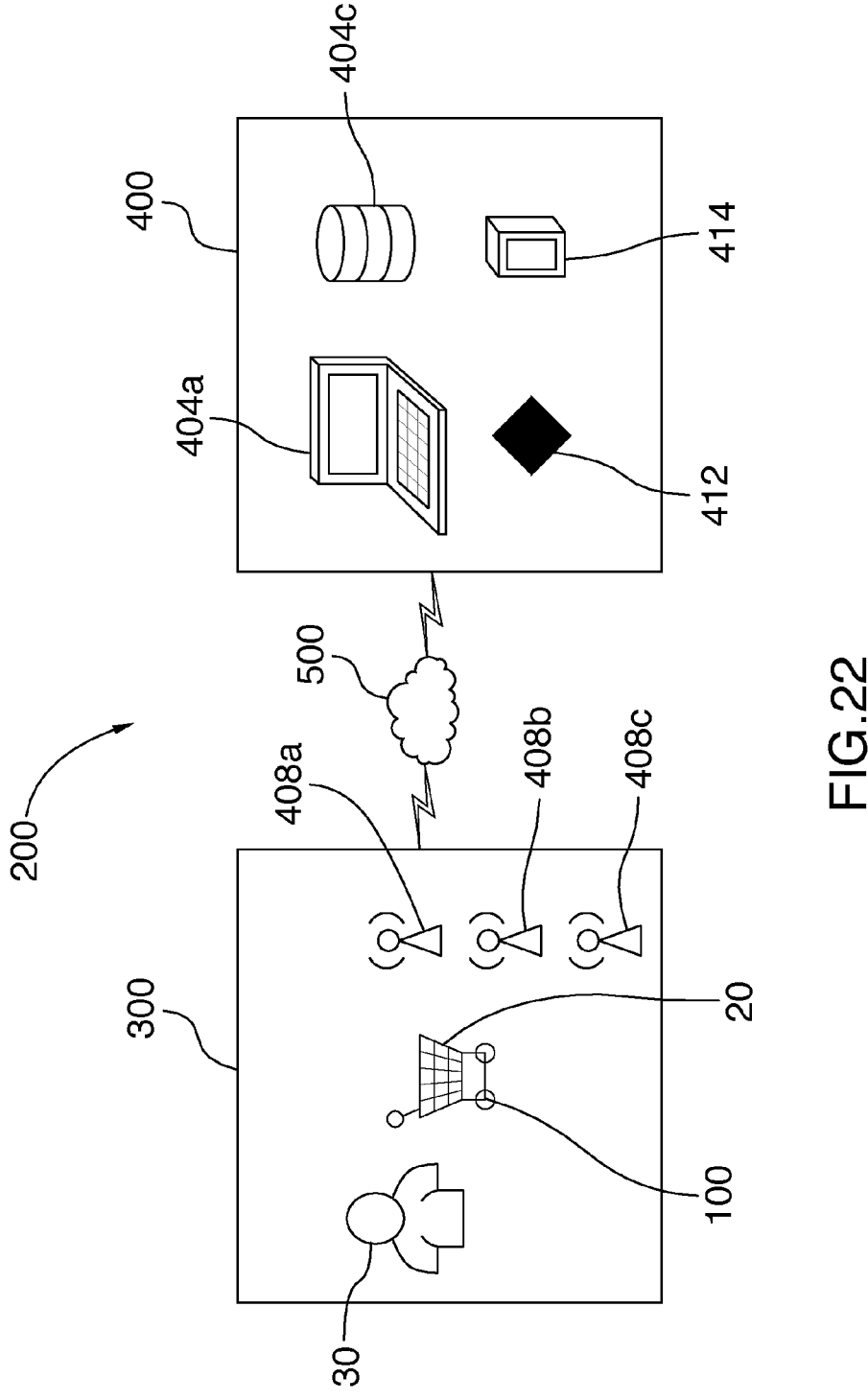
Figure 23:
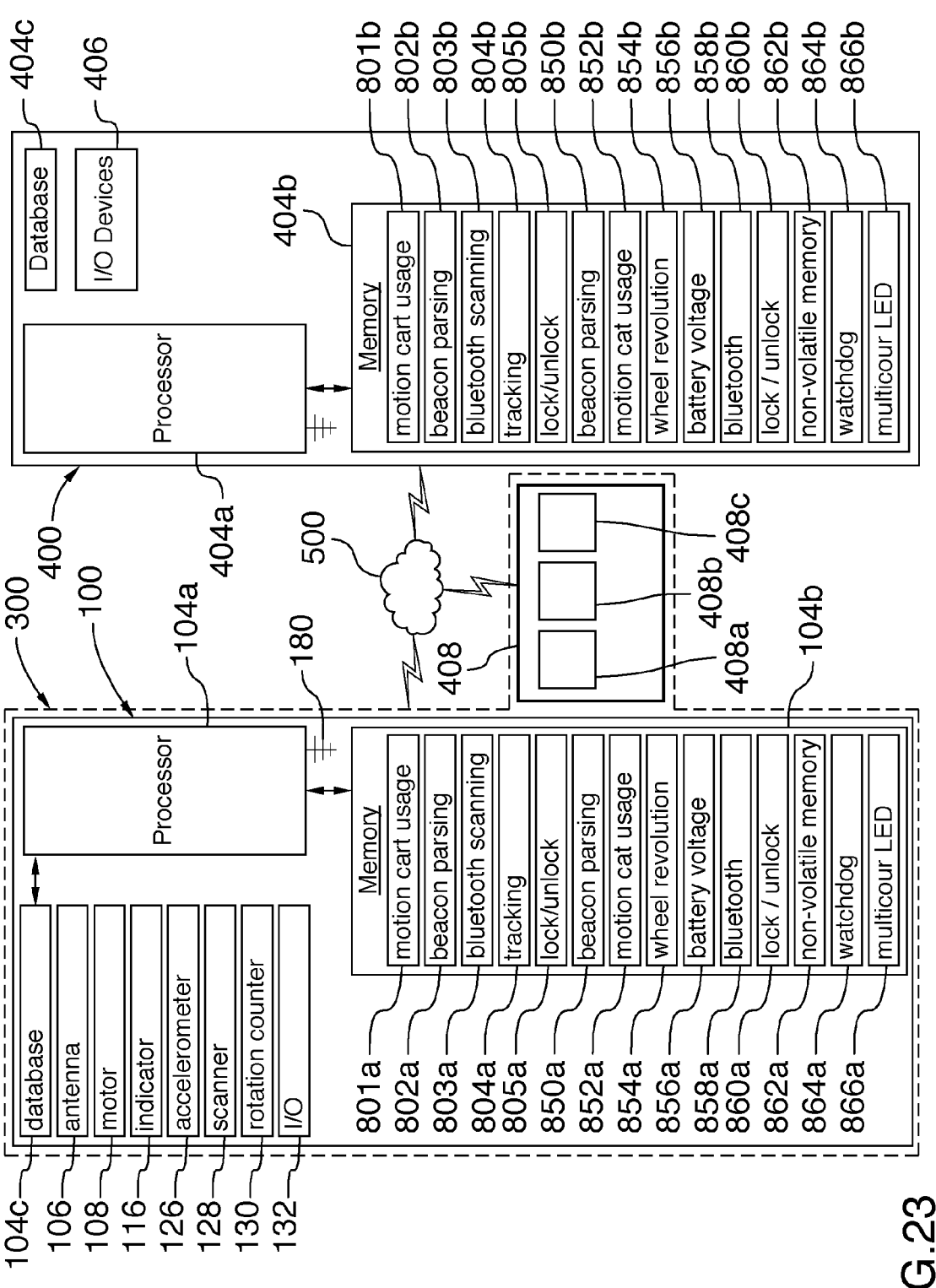
Figure 24:
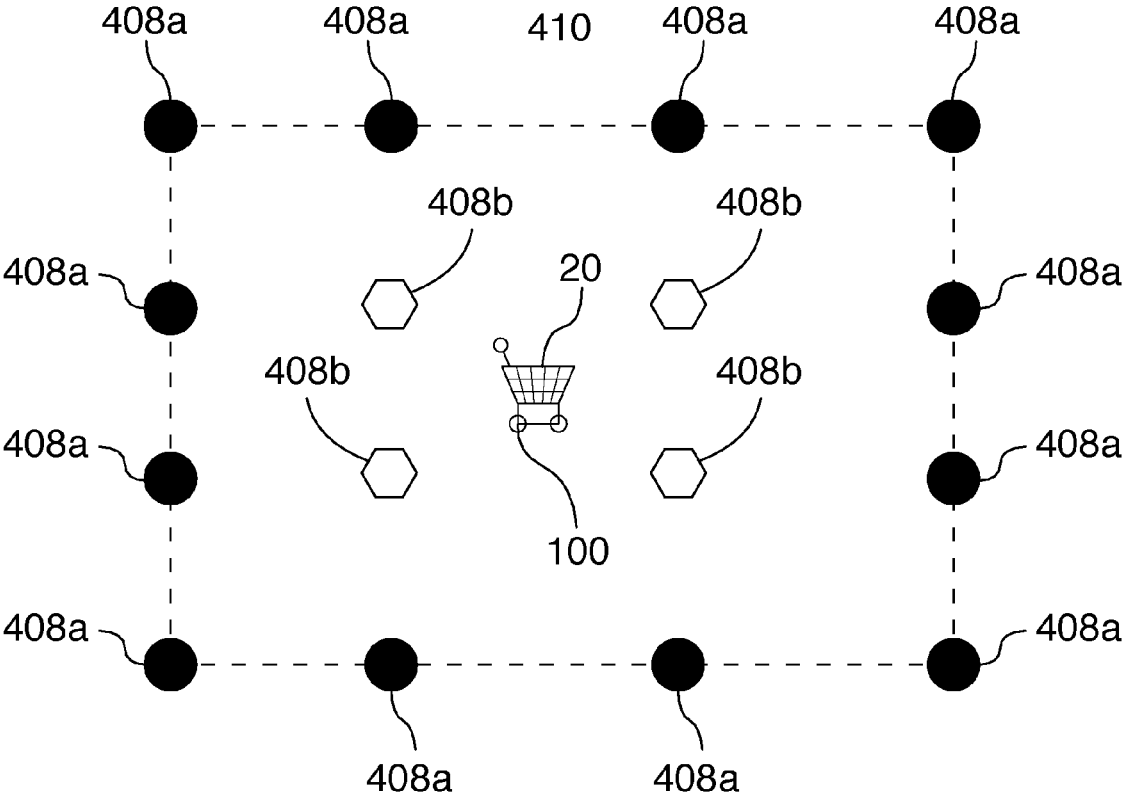
Figure 25:
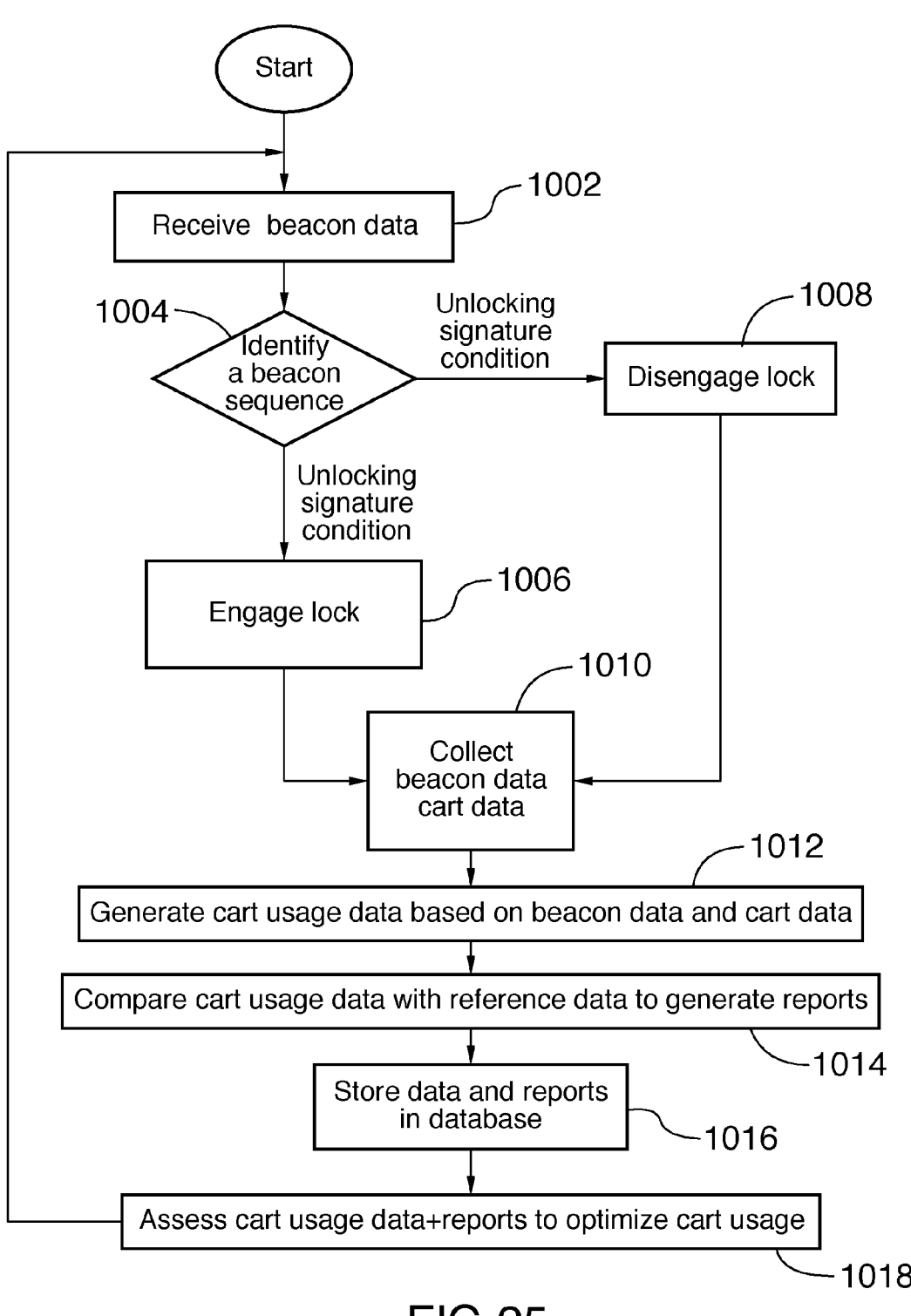

FIG. 1C is a side elevation view of the caster and brake assembly shown in FIG. 1A, with a portion of the housing removed to reveal internal components of the brake assembly;

FIG. 1D is another perspective and partial cross-sectional view of the wheel and braking assembly shown in FIG. 1C taken along line "D-D";

FIG. 1E is an exploded perspective view of the caster and braking assembly shown in FIG. 1B;

FIGS. 1F and 1G are schematic diagrams of the brake assembly shown in FIG. 1A in an unlock position;

FIGS. 1H and 1I are schematic diagrams of the brake assembly shown in FIG. 1A in an intermediate position;

FIGS. 1J and 1K are schematic diagrams of the brake assembly shown in FIG. 1A in a lock position;

FIG. 2 is a schematic diagram of a system for controlling the brake assembly in accordance with a preferred embodiment;

FIG. 3 is a schematic diagram for motion detection and cart usage in accordance with a preferred embodiment;

FIG. 4 is a schematic diagram for a beacon ID decoder in accordance with a preferred embodiment;

FIG. 5 is a schematic diagram for a Bluetooth scanning state machine in accordance with a preferred embodiment;

FIG. 6 is a schematic diagram for motion tracking between scans in accordance with a preferred embodiment;

FIG. 7 is a schematic diagram showing a lock/unlock wheel state machine in accordance with a preferred embodiment;

FIG. 8 is a screenshot of the configuration process for a mobile application showing creation of a new beacon advertiser configuration in accordance with a preferred embodiment;

FIG. 9 is another screenshot of the configuration process for the mobile application showing name input for the advertiser;

FIG. 10 is another screenshot of the configuration process for the mobile application showing selecting a UUID;

FIG. 11 is another screenshot of the configuration process for the mobile application showing accepting the UUID;

Figure 12:
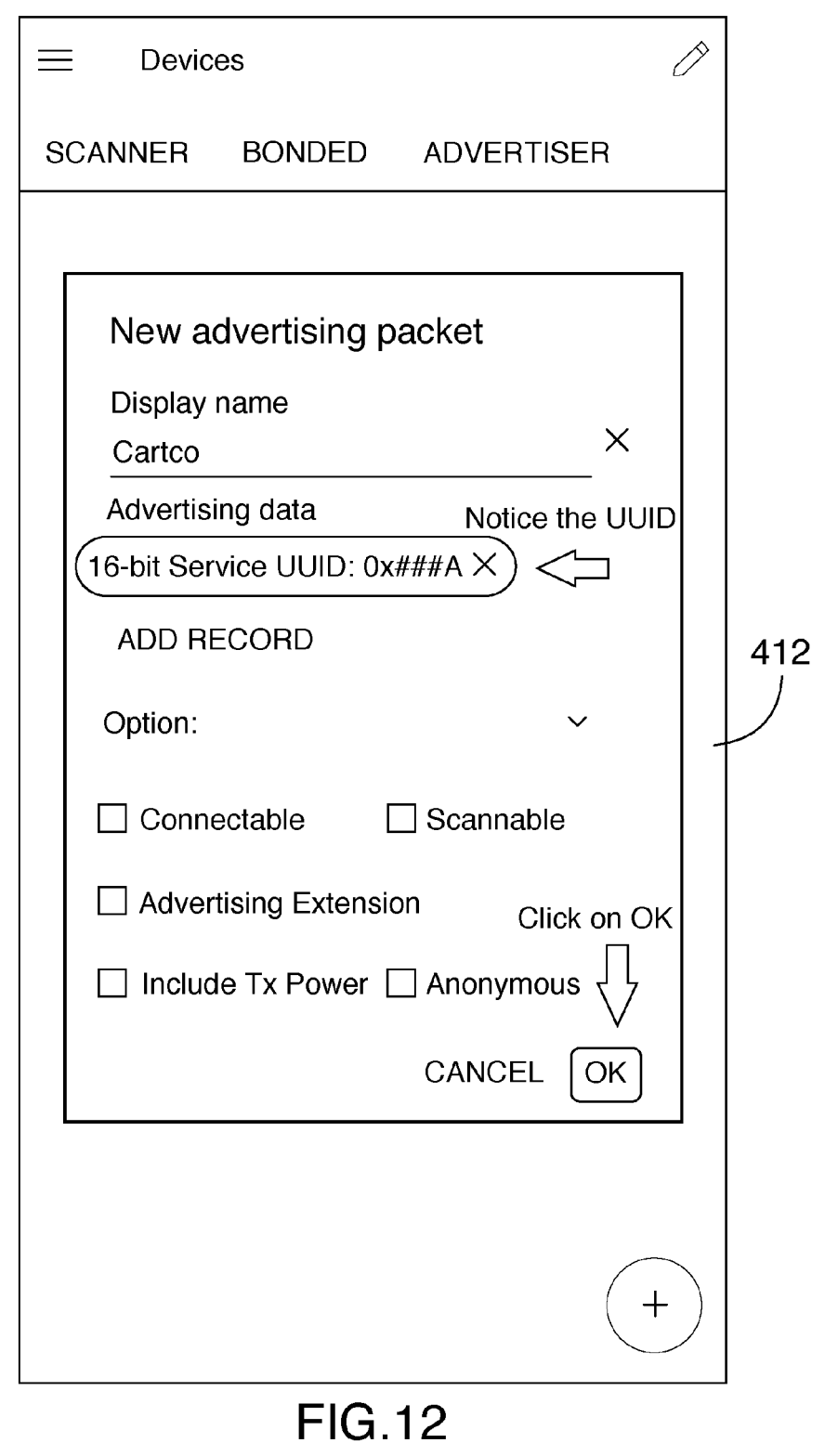

FIG. 12 is another screenshot of the configuration process for the mobile application showing confirming the UUID;

FIG. 13 is another screenshot of the configuration process for the mobile application showing completion of the set-up for the advertiser;

FIG. 14 is a schematic flowchart diagram for hardware inspection in accordance with a preferred embodiment;

FIG. 15 is a schematic diagram of blocks of a microcontroller embodying firmware operation in accordance with a preferred embodiment;

FIG. 16 is a schematic diagram of block 1 of the microcontroller responsible for beacon data parsing in accordance with a preferred embodiment;

FIG. 17 is a schematic diagram of block 2 of the microcontroller responsible for motion and cart usage tracking in accordance with a preferred embodiment;

FIG. 18 is a schematic diagram of block 3 of the microcontroller responsible for wheel revolution analysis in accordance with a preferred embodiment;

FIG. 19 is a schematic diagram of block 4 of the microcontroller responsible for battery voltage reading in accordance with a preferred embodiment;

FIG. 20 is a schematic diagram of block 5 of the microcontroller responsible for Bluetooth™ operation state machine in accordance with a preferred embodiment;

FIG. 21 is a schematic diagram of block 6 of the microcontroller responsible for lock/unlock operation state machine in accordance with a preferred embodiment;

FIG. 22 is a schematic diagram showing the deployment of a shopping cart incorporating the braking system in accordance with a preferred embodiment;

FIG. 23 is a schematic diagram of a system in accordance with a preferred embodiment;

FIG. 24 is a schematic diagram of the beacons in accordance with a preferred embodiment; and FIG. 25 is a flow diagram of a method of optimizing cart usage in accordance with a preferred embodiment.

DETAILED DESCRIPTION OF THE PREFERRED EMBODIMENTS

Certain novel features which are believed to be characteristic of a brake assembly and system for use with a brake assembly are novel in conjunction with the cooperating environment, according to the present invention, as to their organization, use, and/or method of operation, together with further objectives and/or advantages thereof, may be better understood from the accompanying disclosure in which presently preferred embodiments of the invention are disclosed by way of example. These examples are provided for the purposes of explanation, and not of limitation, of those principles and of the invention. It may be apparent to one skilled in the relevant art(s) how to implement the present disclosure in alternative embodiments.

In the description, like parts are marked throughout the specification and the drawings with the same respective reference numerals. The figures may not be to scale, and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

In order that the invention may be more fully understood, it will now be described, by way of example, with reference to the accompanying drawings in which FIG. 1 through FIG. 25 illustrate embodiments of the present invention.
Brake Assembly Persons having ordinary skill in the art will understand that a caster (or "castor") is an undriven, single, double, or compound wheel that is designed to be attached to the bottom of an object (e.g., shopping carts, office chairs, hospital beds, material handling equipment, etc.) to enable that object to be moved. Casters are available in various sizes, and are commonly made of rubber, plastic, nylon, aluminum, or stainless steel. Casters may be fixed to roll along a straight-line path or mounted on a pivot such that the wheel will automatically align itself to the direction of travel.

Persons having ordinary skill in the art will understand that a rigid caster consists of a wheel mounted to a stationary fork. The orientation of the fork, which is fixed relative to the vehicle, is determined when the caster is mounted to the object. Rigid casters typically restrict vehicle motion so that the object travels along a straight line.

Persons having ordinary skill in the art will understand that a swivel caster incorporates a wheel mounted to a fork (or alternately a "yoke"), but an additional swivel joint above the fork allows the fork to freely rotate about 360°, thus enabling the wheel to roll in any direction. This makes it possible to easily move the object in any direction without changing its orientation.

Additionally, swivel casters typically include a small amount of offset distance between the center axis of the vertical shaft and the center axis of the caster wheel. When the caster is moved and the wheel is not facing the correct direction, the offset will cause the wheel assembly to rotate around the axis of the vertical shaft to follow behind the direction of movement. If there is no offset, the wheel will not rotate if not facing the correct direction, either preventing motion or dragging across the ground. The angle of, and distance between the wheel axles and swivel joint can be adjusted for different types of caster performance.

Referring now to FIGS. 1A and 1B, there is depicted a caster 10 and brake assembly 100 in accordance with a preferred embodiment of the present invention. The caster 10 includes a wheel 12 mounted to a fork 14 (or alternately "yoke 14"). A joint 16 projecting from an upper surface of the fork 14 facilitates the free rotation of the fork 14 about 360° enabling the wheel 12 to roll in any direction. A mounting screw 18, projecting upwards from the joint 16 to facilitate engagement of the caster 10 with a cart 20. The mounting screw 18 is horizontally offset from a center axis "A" of the wheel 12.

The brake assembly 100 is mounted to the caster 10 at a side of the fork 14 and shown in the foreground of FIG. 1B.

The brake assembly 100 has a housing 102, which includes an inner panel 15 fixed to the fork 14 and an outer panel 17 releasably secured to the inner panel 15 by a plurality of screws. Defined between the inner panel 15 and the outer panel 17 is a compartment 19 that accommodates various components of the brake assembly 100, namely electronics 104 (including a processor 104a, processor memory 104b, and a database 104c), an antenna 106 for sending and receiving data, a motor 108 adapted to initiate brake engagement and disengagement (as described below), a power source 110 to power the components, a cam 112 to facilitate brake engagement and disengagement (as described below), a locking plate 114 to facilitate brake engagement and disengagement (as described below), a locking lever 118 to facilitate brake engagement and disengagement in cooperation with the cam 112 and the locking plate 114 (as described below and shown in FIG. 1D), and an LED 116 (not shown) for providing alerts and/or indicating brake status, as best shown in FIG. 1C.

As shown in FIGS. 1D and 1E, a shaft 22 extends along center axis "A" of the wheel 12 and is rotatably mounted to the fork 14. One or more bearings 24 are used to facilitate rotation of the shaft 22 about axis "A". One end of the shaft is connected to the locking plate 114, while the other end is adapted for free rotation and is accommodated within a bearing housing 124 mounted on a side of the fork 14 opposite the brake assembly housing 102.

A locking lever 118 adapted to pivot about a locking lever pin 120 between a lock position, such that a locking plate engagement end of the lever 118 engages the locking plate 114, and an unlock position, such that the locking plate engagement end of the lever 118 disengages the locking plate 114. The motor 108 rotates the cam 112 between a cam engagement position of the locking lever 118, such that a surface of the cam 112 engages a cam engagement end of the locking lever 118 to urge it into the unlock position, and a cam disengagement position of the locking lever 118, such that the cam 112 does not urge the locking lever 118 into the unlock position allowing the lever 118 to return to the lock position. In a preferred embodiment, the locking lever 118 is urged into the lock position by a biasing means 122 or resilient member 122 (e.g., torsion spring). In the lock position, the locking plate engagement end of the lever 118 is received within a depression defined at an edge of the locking plate 114. The depression is configured to prevent further rotation of the locking plate 114 which, in turn, prevents further rotation of the shaft 22 and wheel 12. In the unlock position, as shown in FIG. 1D, the locking plate engagement end of the lever 118 is disengaged from the depression defined by the locking plate 114 to allow rotation of the locking plate 114 and, by extension, rotation of the shaft 22 and wheel 12. One or more limit switches 134 are provided and adapted to define the limit of travel of the cam 112.

In accordance with a preferred embodiment of the present invention, the locking mechanism in the unlock position, an intermediate position, and the lock position are depicted in FIGS. 1F and 1G, 1H and 1I, and 1J and 1K, respectively. As shown in FIGS. 1F and 1G, in the unlock position the cam 112 is positioned to activate a first limit switch 134a. The cam 112 engages the cam engagement end of the locking lever 118 to urge the lever 118 into the unlock position (i.e., the locking lever 118 is not in contact with the locking plate 114. The resilient member 122 is compressed to its maximum point ("L1") in the unlocked position. As shown in FIGS. 1H and 1I, in the intermediate position the cam 112 is positioned to activate a second limit switch 134b. While the cam 112 is not in contact with the locking lever 118, the lever 118 is in contact with the locking plate 114 (i.e., disengaged from the depression defined by the locking plate 114). The resilient member 122 is compressed at a position less than the maximum point ("L2") in the intermediate position. As shown in FIGS. 1J and 1K, in the lock position the cam 112 is positioned to activate the second limit switch 134b. The cam 112 is in contact with the locking lever 118 and the lever 118 is received within the depression defined by the locking plate 114. The resilient member 122 is compressed at a minimum point ("L3") in the locked position.

In accordance with a preferred embodiment of the present invention, when the processor 104a analyzes the data from the beacons received via the antenna 106 and determines a locking signature condition (i.e., to invoke braking), the motor 108 rotates the cam 112 to the disengagement position, defined by the limit switch 134, such that that cam 112 is disengaged from the locking lever 118 which allows the lever 118 to pivot to the lock position to prevent further rotation of the wheel 12 (as described above).

In accordance with a preferred embodiment of the present invention, when the processor 104a analyzes the data from the beacons received via the antenna 106 and determines an unlocking signature condition (i.e., to release the brake), the motor 108 rotates the cam 112 to the engagement position, as defined by the limit switch 134, such that the cam 112 engages the locking lever 118 which allows the lever 118 to pivot to the unlock position to allow further rotation of the wheel 12 (as described above).

Persons having ordinary skill in the art will appreciate that the foregoing embodiment of the brake assembly 100 differs from the prior art, which achieves wheel braking by positioning a ball bearing within a bearing groove, such that (i) the wheel rotates when the ball bearing is not within the bearing groove and (ii) the wheel cannot rotate when the ball bearing is within the bearing groove.

System

Embodiments of the system described herein may be implemented in hardware or software, or a combination of both. These embodiments may be implemented in computer programs or algorithms executing on programmable computers, each computer including at least one processor, a data storage system (including volatile memory or non-volatile memory or other data storage elements or a combination thereof), and at least one communication interface.

Each program may be implemented in a high-level procedural or object-oriented programming or scripting language, or both. Alternatively, the programs or algorithms may be implemented in assembly or machine language, if desired. The language may be a compiled or interpreted language. Each such computer program may be stored on a non-transitory computer-readable storage medium (e.g., read-only memory, magnetic disk, optical disc). The storage medium so configured causes a computer to operate in a specific and predefined manner to perform the functions described herein.

As the term "block" is used in the description of the various embodiments, a block includes a functional block that is implemented in hardware or software, or both, that performs one or more functions such as the processing of input data to produce output data.

Referring to FIGS. 1A through E, 22 and 23 there is shown a caster 10 and brake assembly 100 for use in association with the system 200 and the method 1000 and/or under influence of a related computer readable medium 1100. In one preferred embodiment, the system 200, method 1000 and/or computer readable medium 1100 may be configured for use with alternate casters (not shown) and/or brake assemblies (not shown) in accordance with the present invention. FIGS. 2 through 7 show a hierarchical state machine specification to control the operation of the brake assembly 100, the power saving modes, the scanning mode, and/or cart usage analysis in accordance with a preferred embodiment. FIGS. 8 through 13 show the configuration of the brake assembly 100 and mobile application 412. FIGS. 14 through 21 depict a hierarchical state machine specification and modes of operation to control wheel lock/unlock operations, power saving modes, turning on/off the Bluetooth advertisement and scanning, reading battery voltage, and/or determining and storing data including cart usage, mileage and lock history in accordance with an alternate preferred embodiment. FIG. 24 depicts the beacons used in association with the system 200. FIG. 25 depicts a method of optimizing cart usage.

Some parts of the system 200 depicted in FIGS. 22 and 23 may be provided at a remote location. Preferably, and as best seen in FIG. 22, the system 200 includes a brake assembly subsystem 300 and an administrator subsystem 400.

In FIGS. 22 and 23, the system 200 is shown in use with a communication network 500. The communication network 500 may include satellite networks (e.g., GPS), terrestrial wireless networks, and the Internet. The communication of data between the brake assembly subsystem 300 and the administrator subsystem 400 may also be achieved via one or more wired means of transmission (e.g., docking the cart 20 in a base station associated with the administrator subsystem 400, not shown), or other physical means (e.g., a Universal Serial Bus cable and/or flash drive) of transmission. Persons having ordinary skill in the art will appreciate that the system 200 includes hardware and software.

FIGS. 22 and 23 schematically illustrates, among other things, that the brake assembly subsystem 300 includes the brake assembly 100 for measuring and/or receiving data associated with the cart 20 and/or user 30 of the associated cart, and the brake assembly processor 104a, the computer readable memory 104b (e.g., the onboard processor-readable memory) local to the processor 104a, the database 104c, brake assembly input-output components 132 (e.g., the LED 116, display, auditory, and/or tactile components), the antenna 106, the motor 108, the power source 110, an accelerometer 126, a scanner 128, and/or a wheel rotation counter 130. The administrator subsystem 400 includes an administrator processor 404a (which may preferably be provided as a component of a tablet, laptop, computer, smartphone, server or any other device that may be known to a person of skill in the art), an administrator database 404c, input-output devices (e.g., a graphical user interface, a printer for generating reports, etc.) 406, a computer readable medium 404b (e.g., a processor-readable memory) local to the administrator processor 404a, one or more beacons 408a, 408b, 408c and/or a mobile application 412. In alternative embodiments, the brake assembly subsystem 300 may be configured without the accelerometer 126, the scanner 128, and/or the wheel rotation counter 130.

Brake Assembly Subsystem

As shown in FIG. 23, the brake assembly 100 preferably includes the brake assembly processor 104a, the computer readable memory 104b (e.g., the onboard processor-readable memory) local to the processor 104a, the database 104c, brake assembly input-output components 132 (e.g., display, LED 116, auditory, and/or tactile components), the antenna 106, the motor 108, the power source 110, the accelerometer 126, the scanner 128, and/or the wheel rotation counter 130.

Preferably, the brake assembly 100 is adapted to automatically collect data 901 associated with the cart 20 and/or the user 30 (e.g., scanning status, locking status, movement status, motion, accelerometer, power saving, wheel revolution, battery voltage, etc.) using the antenna 106, the accelerometer 126, the scanner 128 and/or the wheel rotation counter 130. Using the antenna 106 (alternatively, the "transmitter-receiver 106"), the processor 104a may wirelessly communicate via the communication network 500 (e.g., by the Bluetooth™ Low Energy proprietary open wireless technology standard which is managed by the Bluetooth Special Interest Group of Kirkland, Washington) with—or may be wired to communicate with—the administrator processor 404a. In a preferred embodiment, the transmitter-receiver 106 includes a UHF transceiver in standard frequency references (e.g., 2.45 GHz band). Notably, the transmitter-receiver 106 does not include a VLF receiver as the system 100 does not require a buried wire or VLF signal used by prior art systems. Additional transceivers that may be included in the system 100 are ISM transceivers (2.4 GHz) and UWB (ultra-wideband) transceivers and may be exemplified by a transceiver in the nRF52 family offered by Nordic.

In a preferred embodiment, the system 200 and/or the brake assembly subsystem 300 may include a hardware and/or software application that allows for the receipt of data 901 associated with the cart 20 and/or the user 30 that has the capability to use the 802.11 protocol, Bluetooth communication and/or another linkage. For example, cellular communication and/or the communication network 500 may be used. Additional hardware and/or software applications may: (i) be enacted upon associating the brake assembly 100 with a caster 10, a cart 20 and/or a user 30; (ii) connect wirelessly to the administrator processor 404a (e.g., via Bluetooth, Wi-Fi and/or another linkage); (iii) receive data 901, 903 from the administrator processor(s) 404a; and/or (iv) store the cart data 901 and/or the beacon data 903 (e.g., Beacon ID, RSSI, etc.), in the database 104c for subsequent transmission to the administrator database 404c.

The data 901, 903 may be transmitted to the administrator database 404c and/or the administrator processor 404a at regular intervals throughout the duration of association of the processor 104a with the caster 10, cart 20 and/or user 30, at regular intervals throughout each day, at discretionary or event triggered intervals (e.g., unauthorized crossing of the perimeter) and preferably at least by the end of each day. In an alternate embodiment, instead of (or in addition to) storing data 901, 903 in the database 104c, the data 901, 903 is preferably transmitted in real-time using the transmitter-receiver 106 to the administrator processor 404a and/or the administrator database 404c.

Referring now to FIG. 2, there is shown a schematic of the system 200 for controlling the brake assembly 100, and input/output data, in accordance with a preferred embodiment. A hierarchical state machine specification is preferably implemented on the processor 104a to control the operation of the brake assembly 100, the power saving modes (e.g., using motion analysis), turning on/off the scanning mode, and/or cart usage analysis. Persons having ordinary skill in the art will understand that a state machine is any device that stores the status of something at a given time and can operate on input to change the status and/or cause an action or output to take place for any given change. A computer may be considered a state machine where each machine instruction is input that may change one or more states and cause other actions to occur. Hierarchical state machine design organizes the states as a hierarchy.

In a preferred embodiment, the brake processor 104a receives asynchronous beacon data 903 from one or more beacons 408 (e.g., Received Signal Strength Indication or "RSSI", beacon ID), when available, alongside synchronous cart data 901 (including accelerometer information and/or wheel rotation count) from the accelerometer 126 (e.g., at 10 Hz). The accelerometer 126 is preferably a MEMS motion sensor. The wheel rotation counter 130 may also be included in accordance with the present invention. The accelerometer 126 and rotation counter 130 are preferably used to facilitate activation of a low-power mode and track the usage of the cart. The system 100 includes one or more state machines 600 (e.g., algorithmic state machines) adapted to track the scanning, locking, and movement status (or states) of the cart. The processor 104a also outputs signals to the scanner 128 to start/stop scanning and to the motor 108 to engage/disengage the brake, and is further adapted to determine cart usage on-demand (for example).

In a preferred embodiment, RSSI is used for the transmissions from the beacons 408 (i.e., not from wireless access points). Notably, the system 200 does not generate and send a signal strength measurement in normal operation compared with approaches in the prior art. The brake assembly 100 preferably relies on external anchors (e.g., beacons 408a, 408b, 408c) and is autonomous in making decisions, such that different signal types are associated with beacons 408a, 408b, 408c inside and outside the perimeter 410. The transition between the different signal types engage/disengage the wheel brake.

In a preferred embodiment, the functionality of the processor 104a is provided by five blocks: (i) block 1—motion detection and cart usage 601; (ii) block 2—beacon ID decoder 602; (iii) block 3—Bluetooth scanning state machine 603; (iv) block 4—motion tracker between scans 604; and (v) block 5—lock/unlock wheel state machine 605.

(i) Block 1—Motion Detection and Cart Usage

In a preferred embodiment, the motion detection and cart usage block 601 uses accelerometer data generated by the accelerometer 126 with a continuous moving average filter over a predetermined time-period (e.g., one second) to detect cart (or wheel) motion. A Boolean signal is generated, called "motion" as shown in FIG. 3. An integrator is preferably applied by the processor 104a (or processor 404a) to compute the overall cart usage using, for example, a motion detection and cart usage algorithm 801. The "motion" signal is also used to control the start/stop scanning state machine (as described below). In a preferred embodiment, accelerometer data is collected as cart data 901.

(ii) Block 2—Beacon ID Decoder

In a preferred embodiment, the beacon ID decoder block 602 as shown in FIG. 4, the processor 104a refers to a look-up table to decode a beacon ID detected by the scanner 128, using a beacon algorithm 802 for example, as either (a) the fence beacon 408a (fence_bcn), (b) the parking beacon 408b (parking_bcn), or (c) the unlock override beacon 408c (unlock_bcn). The Boolean output signal is preferably generated by Block 2. If the beacon ID is unknown, no signal will be generated. In a preferred embodiment, the beacon ID is collected as beacon data 903.

(iii) Block 3—Bluetooth Scanning State Machine

In a preferred embodiment, as shown in FIG. 5, the Bluetooth scanning state machine 603 determines whether the scanning mode, provided by the scanner 128, should be ON or OFF, using the Bluetooth scanning algorithm 803 for example. The machine 603 is adapted to receive the "motion" signal from Block 1 as input and creates output states for Bluetooth scanning and non-scanning modes, i.e., scan=ON or scan=OFF. The non-scanning mode is preferably triggered when the signal "motion" is disabled for a predetermined minimum period-of-time (e.g., 60 seconds) to conserve battery power. If the non-movement of the cart 20 exceeds a predetermined threshold value, the scanning mode is preferably disengaged. When in the non-scanning mode, as soon as the signal "motion" is enabled, the scanning will be initiated. In a preferred embodiment, the scanning status is collected as cart data 901.

(iv) Block 4—Motion Tracker Between Scans

In a preferred embodiment, the motion tracker between scans block 604 as shown in FIG. 6, between the receipt of two beacon IDs, the motion of the cart 20 is tracked by the accelerometer 126 and/or the administrator subsystem 400, for example, to trigger a lock condition (i.e., engagement of the brake), if the cart 20 is removed from a predetermined authorized zone. In a preferred embodiment, a tracking algorithm 804 is used to track the cart. This is shown by the variable "motion_tracker", which is accumulated by the sampling period of the accelerometer 126 (i.e., 100 ms at 10 Hz sampling rate, every time the signal motion=1 is received from Block 2. When a new valid beacon ID is received, the tracker variable is set back to 0. In a preferred embodiment the motion tracker information is collected as cart data 901.

(v) Block 5—Lock/Unlock Wheel State Machine

In a preferred embodiment, as shown in FIG. 7, the lock/unlock wheel state machine 605 is responsible for triggering the lock condition for the cart 20. The sequence includes detecting the fence beacon 408a initially, and then having the accelerometer 126 from Block 4 reach a minimum predetermined delay (e.g., 30 seconds) to trigger a lock condition. If the parking beacon 408b or the fence beacon 408a is detected, the state will transition as shown in FIG. 7 using, for example, a lock/unlock algorithm 805. In a preferred embodiment, the wheel 12 can be locked when the order of beacons encountered (or detected) is prohibited. For example, from inside a retail outlet (e.g., detecting a parking beacon 408b) to the parking lot (e.g., detecting a fence beacon 408a) without stopping at a payment location.

In a preferred embodiment, during a lock condition, there are two ways the cart 20 can be unlocked as depicted in FIG. 7. First, is by bringing the specific unlock beacon 408c near the cart 20, which will transmit the input signal unlock_bcn=1. Second, is to bring the cart 20 back to the allowed defined perimeter 410, which defines the authorized area for the cart 20, which implies that the fence beacon 408a will eventually be detected by the scanner 128, i.e., fence_bcn=1.

Preferably, the outputs of the processor 104a in FIG. 2 (i.e., lock/unlock signal) will be triggered by the corresponding state transitions shown in FIG. 7. In addition, the scan/no-scan output signal in FIG. 1 is defined by the state machine 603 in Block 3 in FIG. 5. The cart usage is also found by the state machine 601 in Block 1 in FIG. 3.

In a preferred embodiment of the present invention, the system 100 is adapted for use with a mobile application 412 to control the brake assembly 100. The process is preferably implemented based on a third-party Bluetooth enabled application (e.g., nRF Connect). Provided below is the setup for the brake assembly 100 and the procedure to configure the mobile application 412 to control the lock/unlock events. The configuration procedure is preferably done only once for each mobile device 414. In an alternative embodiment, the system 100 is configured for use without the mobile application 412.

The configuration of the brake assembly 100, in accordance with a preferred embodiment, and involves the following steps: (1) turn on the brake assembly 100; (2) the indicator 116 provides an alert (e.g., LED blinking green if the wheel is unlocked and red if the wheel is locked, audible alert, etc.) that the brake assembly 100 is activated and ready to be locked/unlocked by the system 100; and (3) shut down the brake assembly 100 to preserve the battery.

Configuration of the mobile application 412 on the mobile device 414 is shown in FIGS. 8-13. As depicted in FIG. 8, the user selects the "Advertiser" menu (top-right) and then clicks on the "+" sign (bottom-right) to create a new advertiser configuration.

FIG. 9 depicts a step of inputting a name for the advertiser, including selecting "Add Record" and then "Service UUID".

FIG. 10 depicts a step of selecting "Insulin Delivery", for example, and then selecting the recommended UUID displayed by the mobile device 414.

FIG. 11 depicts a step of selecting "OK" to add the above UUID.

FIG. 12 depicts a step of confirming the UUID shown (e.g., Ox ###A) and then selecting "OK" to add the new configuration. Persons skilled in the art will appreciate that UUID is a universally unique identifier (e.g., a 128-bit number) used to identify information in computer systems. UUIDs are unique when generated according to prior art methods. In a preferred embodiment of the present invention, UUIDs are randomly generated (e.g., using a UUID scrambler).

FIG. 13 depicts the completion of the set-up for the advertiser. The advertiser may be turned ON/OFF to control the Lock/Unlock events. The configuration is preferably stored on the mobile device 414 by the application 412 until, for example, it is deleted by the user. Therefore, there is no need to set up the advertiser again.

In a preferred embodiment of the present invention, the locking procedure for the brake assembly 100 is controlled by the mobile application 412. Upon configuring the advertiser and opening the mobile application 412, when the advertiser is turned ON, the processor 104a, 404a will observe it as a valid fence beacon 408a, and therefore, when the advertiser is turned OFF, the brake assembly 100 will lock after a predetermined timeout (e.g., 5 seconds). Next, when the brake assembly 100 is locked, if the advertiser is turned back ON, the assembly 100 will instantaneously be unlocked. This process can be repeated for as long as the battery lasts. Preferably, the Bluetooth signal from the mobile device 414 is a predetermined strength (e.g., within a few meters distance from the braking assembly 100 or in the same room, as otherwise, the lock/unlock procedure may not work). Persons skilled in the art will understand that the strength of the Bluetooth signal may be variable depending on the desired application and/or physical environment.

In an alternate embodiment, a second process for configuring the mobile application 412 includes: (i) opening the mobile application 412 and selecting the "Advertiser" menu; (ii) selecting "New" to create a new advertiser configuration; (iii) inputting a name for the advertiser, and then selecting on "Add Service"; (iv) from the available list of services, selecting "Insulin Delivery" (for example) and noticing the UUID appearing as "###A", then selecting "Done" to finalize the configuration. After setting up the configuration, the lock/unlock procedure may be controlled by turning the created advertiser ON or OFF.

In an embodiment of the invention, the mobile application 412 may be installed on two or more mobile devices 414. To avoid conflicting instructions with respect to lock/unlock events, however, a single mobile application 412 (or device 414) should be designated as the primary application at any given time (e.g., the system 200 is configured to only allow a connection request). In an alternate embodiment, the mobile devices 414 are adapted to support multiple simultaneous inbound connections or instructions. For example, a beacon 408 could automatically lock the carts overnight while the mobile application 412 could be adapted to connect simultaneously to one or more carts 20 in order to unlock the brake assembly 100. For example, carts adapted for use in an airport may provide "tokens" (e.g., digital, virtual, etc.) to facilitate the borrowing of one or more carts by travellers for a predetermined amount of time. In a preferred embodiment, the system 200 is adapted to facilitate multiple simultaneous connections between a cart 20 and one or more beacons 408 and/or one or more mobile applications 412. For example, one or more carts may be adapted to connect to a mobile application associated with a user (i.e., like an electronic leash) and configured to lock the one or more carts if the distance between the user and the one or more carts exceeds a predetermined distance.

In a preferred embodiment, the system 200 further includes a security subsystem adapted to authenticate the beacons 408. A cryptographic key, for example, may be defined for a given configuration. Persons having ordinary skill in the art will appreciate that the key may be 128-bit, 256-bit or as commonly used in accordance with the advanced encryption standard. In a preferred embodiment, a signature (i.e., a unique signal) associated with a beacon and optionally a nonce (i.e., an arbitrary number that can be used just once in a cryptographic communication), along with encryption of the beacon data using a security algorithm compliant with the advanced encryption standard, is used in accordance with the present invention. This embodiment will make each beacon different to prevent, for example, replay attacks, while maintaining the content of the beacon data once it is decrypted with the shared encryption key and removing the nonce. Persons skilled in the art will understand that alternate similar cryptographic methods may also be used in accordance with the present invention. The advanced encryption standard, and other similar block cyphers, are advantageous in that most processors are relatively efficient at computing the algorithm.

In a preferred embodiment of the invention a hierarchical state machine specification and modes of operation, using firmware, are preferably executed on the processor 104a to provide the following functionality: (1) controlling the wheel lock/unlock operations; (2) power saving modes through motion analysis and wheel revolutions; (3) turning on/off the Bluetooth advertisement and scanning; (4) reading battery voltage; and/or (5) determining and storing data including cart usage, mileage and lock history.

In a preferred embodiment of the present invention, the system 100 is based on Bluetooth location and beacon technology to create a perimeter 410 around an area (e.g., retail store, property, etc.) as shown in FIG. 24. Shopping carts 20 are preferably tracked within the defined perimeter 410 and associated brake assemblies 100 locked if the carts 20 are taken outside of the perimeter 410. In accordance with a preferred embodiment, locking the brake assembly 100 when the cart 20 is taken outside the perimeter 410 without authorization will prevent the theft and removal of carts. Advantageously, the use of Bluetooth technology and beacons obviates the requirement to embed electric wires through an area (e.g., a parking lot). The system 100 may be adapted for both indoor and outdoor applications.

In a preferred embodiment of the present invention, the system 100 includes the one or more smart beacons 408 (e.g. an Eddystone beacon platform offered by Google) and the braking assembly 100 adapted for use with wireless communication standards (e.g., Bluetooth). The beacon 408 includes existing beacons in the prior art provided by, for example, Kontakt.io (New York, NY) or the equivalent. The brake assembly 100 is adapted to be attached to the at least one caster 10 (e.g., the front right caster) of a shopping cart 20.

In a preferable embodiment of the invention, the brake assembly 100 is adapted to monitor a predetermined area surrounding the cart 20 for the one or more beacons 408a, 408b, 408c when cart movement is detected by the accelerometer 126.

In a preferred embodiment of the present invention, the parking beacon 408b is used to mark the interior of a perimeter while the fence beacon 408a is used to indicate the perimeter 410 itself, as shown in FIG. 24. Once the one or more beacons 408a, 408b, 408c are detected, the processor 104a will analyze the beacon data 903 (including the beacon ID and timestamp of detection) along with the detection sequence for the beacons 408a, 408b, 408c. Based on the beacon IDs detected, the processor 104a preferably determines the approximate location of the cart 20 relative to the perimeter 410. If the cart 20 is moved outside the perimeter 410 (i.e., no fence beacon 408a detected and 10 meters or 30 feet of movement of the shopping cart 20), the processor 104a will trigger the locking mechanism of the brake assembly 100 to arrest movement of the cart. The cart 20 will be unlocked when the shopping cart 20 returns inside the perimeter 410 or alternatively it may be unlocked using the authorized beacon 408c. The mobile application 412 with an authorized beacon signature may also be used to unlock the brake assembly 100.

In a preferred embodiment, the processors 104a, 404a may use methods including Angle of Arrival to locate the angular position of a given cart 20, from the perspective of one or more beacons 408, equipped with one or more phase detection antennas (i.e., RSSI is not solely used to determine cart location).

In a preferred embodiment, beacons are identified by heuristics that use a combination of signal strength information, signal strength variation and transition state detection. The cart preferably includes logic to use transition from one area of a perimeter (e.g., a parking lot) to another area of the perimeter (e.g., fences)—signal drop or low signal—to make autonomous decisions on wheel lock. For example, including the brake assembly processor within the brake assembly housing allows the brake assembly to function autonomously. In a preferred embodiment, the brake assembly processor is adapted to autonomously determine whether to lock or unlock the wheel and/or determine the position of the associated cart within the perimeter based on the signal transmitted by the beacons. The beacons are preferably not adapted to send instructions to the cart, acting as radio references (e.g., similar to a buoy in a navigation system). The beacons preferably do not generate and send signal strength measurements in normal operation. In a preferred embodiment, the passive nature of the beacons facilitates low power consumption to extend battery life and reduce maintenance associated with the beacons. The low power consumption of the beacons in combination with the reduced power consumption of the brake assembly (e.g., deactivating the scanner when the cart is not in motion) maximizes energy efficiency and contributes to the optimization of the system and apparatus of the present invention.

In a preferred embodiment of the invention, when the brake assembly 100 is restarted, the firmware enters a Device Firmware Update ("DFU") mode for possible firmware updates. If there is no activity for a predetermined period of time (e.g., 30 seconds), the application 412 will initiate a software reset and the brake assembly 100 enters a hardware inspection mode (e.g., using a buzzing sound and/or flashing LED colours as shown in FIG. 14). If any one of the components of the brake assembly 100 malfunctions, the hardware initialization will fail and an alert will be sent to the user (e.g., LED colour will turn red, notification on the mobile application, etc.). If none of the components of the brake assembly 100 fail, the firmware enters the regular data collection mode as shown in FIG. 14.

Upon successful initialization, the firmware will operate in a "normal mode" as shown in FIG. 15, where certain input data is provided to generate the lock/unlock commands, alerts, notifications (e.g., LED), as well as some other information about the cart 20, which will be advertised over Bluetooth. FIG. 15 depicts an input/output block diagram of the system 100 in the regular mode of operation.

In an alternate preferred embodiment of the present invention, the functionality of the processor 104*a* is provided by nine blocks: (i) block B1—beacon data parser 650; (ii) block B2—motion and cart usage 652; (iii) block B3 wheel revolution analyzer 654; (iv) block B4—battery voltage reader 656; (v) block B5—Bluetooth operation state machine 658; (vi) block B6—lock/unlock operation state machine 660; (vii) block B7—non-volatile memory 662; (viii) block B8—watchdog timer 664; and (ix) block B9—multi-colour LED 666.

(i) Block B1—Beacon Data Parser

In a preferred embodiment, if the Bluetooth scanning mode is ON (See Block B5 for details on when the scanning is ON/OFF), asynchronous beacon data 903 from the nearby beacons 408*a*, 408*b*, 408*c*, if any, will be detected at predetermined time intervals (e.g., every 300 ms) and analyzed by the beacon data parser 650 using the beacon data parser algorithm 850. A refinement process generates beacon data 903 including the name of the beacon, e.g., P101, and the RSSI value for the beacon in dB, as shown in FIG. 16.

The beacon data 903 may also be used to find the location of the cart 20, i.e., the closest nearby beacon 408*a*, 408*b*. FIG. 16 depicts the beacon scanner block 650 for identifying fence 408*a*, parking 408*b*, and signature unlock 408*c* (or "authorized beacon 408*c*") beacons and to determine an approximate location of the cart 20 by the processor 104*a*.

(ii) Block B2—Motion and Cart Usage Tracker

In a preferred embodiment, a motion and cart usage tracker 652 uses the accelerometer 126 to generate accelerometer data (e.g., sampled at 10 Hz) and detect whether the cart 20 is experiencing instant motion or vibration ("1") or not experiencing motion ("0"). The accelerometer data is preferably also used to determine the cart usage over a predetermined time interval (e.g., minutes) as depicted in FIG. 17. The cart motion and usage tracker algorithm 852 is preferably used to determine cart motion and usage. Cart usage does not include temporary motion/vibrations of the cart 20 when the wheel is not rotating (e.g., when the cart 20 is stationary for more than a predetermined threshold value of time). FIG. 17 depicts the cart motion analyzer block for tracking motion and cart usage history. In a preferred embodiment, the accelerometer data and instant motion/vibration information is collected as cart data 901.

In accordance with a preferred embodiment, tracking the cart usage history (e.g., path that the cart has travelled) throughout a retail space, for example, will facilitate better understanding of user (e.g., consumer) behaviour. The cart usage information could, for example, also be made commercially available to retailers and other interested users. In a preferred embodiment, the cart usage history is collected as cart usage data 905 and/or cart data 901.

(iii) Block B3—Wheel Revolution Analyzer

In a preferred embodiment, a wheel revolution analyzer 654 captures wheel revolution pulses in an asynchronous fashion using a switch (not shown) and the wheel rotation counter 130. The revolution pulses are then used to compute the distance travelled in meters, using a wheel rotation analysis algorithm 854, as shown in FIG. 18. FIG. 18 depicts a wheel revolution capture block to calculate distance travelled (e.g., in meters). In a preferred embodiment, the wheel rotation count is collected as cart data 901.

(iv) Block B4—Battery Voltage Reader

In a preferred embodiment, a battery voltage reader block 656 applies a battery voltage reader algorithm 856, to determine the raw battery voltage at regular intervals (e.g., once every minute) from an Analog to Digital Converter ("ADC") and is then calibrated to deliver the voltage in mV with a higher accuracy (e.g., −50 mV of error on average). FIG. 19 depicts the calibration block to read battery voltage from an ADC. In a preferred embodiment, the battery voltage information is collected as cart data 901.

(v) Block 5—Bluetooth Operation State Machine

In a preferred embodiment, the Bluetooth operation state machine 658 controls the Bluetooth operation of the brake assembly 100, as depicted by FIG. 20 using a Bluetooth operation algorithm 858. It produces the scanning ON/OFF states to manage the power savings. FIG. 20 depicts the scanning mode state machine in accordance with a preferred embodiment.

Referring to FIG. 20, the detailed operation of Bluetooth under the "Scan ON" and "Scan OFF" states are explained as follows:

Scan ON (or "Active Mode"): The cart 20 is moving and the Bluetooth scanning operation, using the scanner 128, is ON to detect nearby beacons 408*a*, 408*b*, 408*c* (e.g., via the communication network 500) for localization and control of lock/unlock operations. If the brake assembly 100 is unlocked, the cart 20 will continuously advertise its internal usage/lock history data. The advertising contents are updated at predetermined intervals (e.g., once every minute). If the brake assembly 100 is locked, the cart 20 will advertise for a predetermined amount of time (e.g., 30 seconds) followed by another predetermined amount of time (e.g., 30 seconds) of no advertisement. This process is repeated at a predetermined regular interval (e.g., every minute).

Scan OFF (of "Low-Power Mode"): Since the cart 20 is not moving, the Bluetooth scanning operation, provided by the scanner 128, is preferably turned off to save energy. If the brake assembly 100 is unlocked, the cart 20 will advertise for a predetermined amount of time at a predetermined interval (e.g., 30 seconds every 15 minutes or 14 minutes and 30 seconds of no advertisement). If the brake assembly 100 is locked, the cart 20 will advertise for a predetermined amount of time followed by a predetermined amount of no advertisement repeated at a predetermined regular interval (e.g., 30 seconds followed by 30 seconds of no advertisement and the process is repeated every minute).

In a preferred embodiment, the scanner status is collected as cart data 901.

(viii) Block B8—Watchdog Timer

In a preferred embodiment, a watchdog timer 664 is provided to enforce a software reset in case of an unexpected firmware crash, or electromagnetic perturbation, using a watchdog timer algorithm 864. Persons having ordinary skill in the art will understand that a watchdog timer (sometimes called a computer operating properly or COP timer) is an electronic or software timer that is used to detect and recover from computer malfunctions. During normal operation, the computer regularly resets the watchdog timer to prevent it from elapsing or "timing out". Accordingly, the watchdog timer is preferably reset once every minute, and if for a predetermined period of time (e.g., five minutes) it is not fed, e.g., due to a firmware crash, it will trigger a restart on the system.

(ix) Block B9—Multi-Colour LED

In a preferred embodiment, a multi-colour LED block 666 uses a multi-colour LED algorithm 866 to indicate different states. The different states are preferably differentiated by, for example, the colour of the indicator 116 (e.g., LED light) on the cart 20, either blinking or always staying ON/OFF, will indicate different states, which are summarized in Table 1. The "Scan ON" and "Scan OFF" states are generated by Block 5 as shown in FIG. 20.

TABLE 1

| Colours and states | | | | | | |
|---|---|---|---|---|---|---|
| No Colour | Blinking Green | Blinking Blue | Blinking Purple | Blinking Red | Blue | Red |
| Unlocked, Scan OFF | Unlocked, Scan ON | Locked, Scan OFF | Locked, Scan ON | Low Battery, Scan OFF | DFU | Hardware Failure |

(vi) Block B6—Lock/Unlock Operation State Machine

In a preferred embodiment, this block 660 controls the lock/unlock events on the cart 20. Using a lock/unlock algorithm 860 and includes commands from the processor 104a to the motor 108 to perform lock/unlock operations. The state transitions for this block 660 are shown in FIG. 21. Upon a software reset, depending on the lock status of the brake assembly 100, the "Normal Mode" or the "Locked Wheel" state will be enforced. Starting from the "Normal Mode" when the cart 20 detects a fence beacon 408a, and then no other beacons 408a, 408b, 408c for a set distance (e.g., five meters) of movement, the alarm will go off, and if the cart 20 moves for an additional set distance (e.g., five meters) without any beacons 408a, 408b, 408c nearby, the brake assembly 100 will lock the wheel. Next, if an Unlock Beacon 408c with an arbitrary RSSI or the fence beacon 408a with a minimum predetermined RSSI (a predetermined distance in open air, e.g., meters) is observed, the wheel will be unlocked (See FIG. 21). In a preferred embodiment, the lock/unlock event information is collected as cart data 901.

(vii) Block B7—Non-Volatile Memory

In a preferred embodiment, the block 662 controls data backup, using a non-volatile memory algorithm 862, at a predetermined time interval (e.g., every 15 minute s), the firmware application will back up the cart usage data (including, for example, mileage and lock history) in the non-volatile memory 104b, such that information about the cart is not lost upon a forced hardware/software restart or a crash. Furthermore, upon the occurrence of a lock/unlock event, the non-volatile memory 104b is preferably updated instantaneously to preserve the lock/unlock state.

Administrator Subsystem

FIG. 22 schematically illustrates, among other things that the administrator subsystem 400 provides a physical or cloud processor 404a and database 404c for processing and consolidating, respectively the cart data 901 and/or beacon data 903. In particular, the administrator subsystem 400 includes an application (e.g., the mobile application 412) for processing the cart data 901 and beacon data 903 and/or transmitting instructions to the brake assembly 100, including: determining motion detection and cart usage (e.g., Block 1, Block B2); decoding the beacon ID (e.g., Block 2); determining the scanning mode of the scanner (e.g., Block 3); determining the motion of the cart between scans (e.g., Block 4); engaging/disengaging the lock for the cart (e.g., Block 5, Block B6); parsing the beacon data (e.g., Block B1); analyzing wheel revolution (e.g., Block B3); reading the battery voltage (e.g., Block B4); operating bluetooth communication (e.g., Block B5); controlling data backup (e.g., Block B7); providing a watchdog timer (e.g., Block B8); and/or controlling a multi-colour LED to indicate various states (e.g., Block B9).

Processors

Preferably, the processors 104a, 404a—i.e., the brake assembly processor 104a and/or the administrator processor 404a—are operatively encoded with one or more algorithms 801a, 801b, 802a, 802b, 803a, 803b, 804a, 804b, 805a, 805b, 850a, 850b, 851a, 851b, 852a, 852b, 854a, 854b, 856a, 856b, 858a, 858b, 860a, 860b, 862a, 862b, 864a, 864b, 866a, 866b (shown schematically in FIG. 23 as being stored in the memory associated with the brake assembly subsystem 300 and/or the administrator subsystem 400) which provide the processors 104a, 404a with motion detection and cart usage logic 801a, 801b, 852a, 852b, beacon data parser logic 802a, 802b, 850a, 850b, Bluetooth scanning logic 803a, 803b, 858a, 858b, tracking logic 804a, 804b, lock/unlock logic 805a, 805b, 860a, 860b, wheel revolution analysis logic 854a, 854b, battery voltage reader logic 856a, 856b, non-volatile memory logic 862a, 862b, watchdog timer logic 864a, 864b, and indicator logic 866a, 866b. Preferably, the algorithms 801a, 801b, 802a, 802b, 803a, 803b, 804a, 804b, 805a, 805b, 850a, 850b, 851a, 851b, 852a, 852b, 854a, 854b, 856a, 856b, 858a, 858b, 860a, 860b, 862a, 862b, 864a, 864b, 866a, 866b, enable the processors 104a, 404a to assess the data 901, 903 received from the brake assembly processor 104a as well as any additional data that may be associated with the caster 10, the cart 20 and/or the user 30.

In a preferred embodiment, each of the brake assembly subsystem 300 and the administrator subsystem 400 may be associated with one or more processors, one or more computer readable media (e.g., an onboard processor-readable memory, for example, a read-only memory (ROM) or dynamic random access memory (DRAM) which communicate with each other via a bus) local to the processor, one or more network interfaces (preferably including transmitter-receiver functions and adapted for use with a network), one or more databases, one or more input-output components, and one or more buses.

The processor may be a microcontroller, an embedded processor, a field programmable gate array ("FPGA") or another suitable microprocessor. Preferably, the processor is operatively encoded with one or more algorithms stored in the memory, which provide the processor with, for example, one or more algorithms to provide logic to enable the processor to assess data 901, 903, 905 as well as any additional data that may be associated with the assembly. In operation, processor receives data from the one or more assemblies, databases, input-output devices, and/or memory which may be on demand and/or at a predetermined time or time intervals (to, for example, drive real-time optimization of cart use). The data is applied and/or implemented by the execution of certain algorithms (e.g., motion and cart usage algorithm) by the processor to generate output data, that includes predetermined metrics on cart usage, tracking, and/or user behaviour.

The system includes various algorithm (e.g., motion detection cart usage algorithm, beacon identification algorithm, lock/unlock algorithm, etc.), which causes the processor to perform any one or more of the instructions discussed herein. The system may include additional or different components, some of which may be optional and not necessary to provide aspects of the present disclosure. The system, as shown in FIGS. 22 and 23, may be connected to other computing devices in a LAN, an intranet, an extranet, or the Internet. The system may operate in the capacity of a server or a client computing device in client-server network environment, or as a peer computing device in a peer-to-peer (or distributed) network environment. Further, while only a single processor is described, the term "processor" shall also be taken to include any collection of computing devices that individually or jointly execute a set (or multiple sets) of instructions to perform any one or more of the methodologies discussed herein.

The system may further include a network interface device, one or more assemblies and one or more input-output devices (e.g., a keyboard and touch screen).

In an embodiment of the present invention, the system depicted in FIGS. 22 and 23 may be entirely or partially replicated remotely (e.g., cloud computing). Preferably, the remote system includes one or more remote processors capable of at least partially executing the method such that data 901, 903 may be uploaded to the administrator subsystem and data 901,903 analyzed.

The computer readable medium stores executable instructions (i.e., algorithms) which, upon execution, analyzes device data, preferably received from the one or more devices, the input-output components and/or the database. The executable instructions provide logic to the processor for the performance of steps and/or to provide functionality as otherwise described above and elsewhere herein. The processor encoded by the computer readable medium are such as to perform an analysis on the data 901, 903 to, for example, generate predetermined and/or desired information. Thus, according to the invention, the computer readable medium facilitates the use of the processor to operatively facilitate the analysis of the data 901,903. In alternate embodiments, the algorithms, may be transmitted or received over network via the network interface device.

Thus, the system, method, and computer readable medium operatively facilitate the optimization of cart usage and tracking.

The database includes, and is regularly updated with, the cart data 901 and beacon data 903. The database may be located behind a firewall relative to the network. Persons of ordinary skill in the art will appreciate that references herein to the database may include, as appropriate, references to: (i) a single database located local to the server; (ii) a single database located at a facility (e.g., remote to the server); and/or (iii) one or more congruent and/or distributed databases such as, for example, also including one or more sets of congruently inter-related databases—possibly distributed across multiple facilities.

Method

Referring now to FIG. 25, there is shown steps of a method 1000 to optimize cart usage in association with cart data 901 and beacon data 903. Persons skilled in the art will understand that optimizing cart usage includes minimizing cart theft. In the description of the method 1000 which follow, the same reference numerals are used as those which are used, above, with reference to the system 200 and brake assembly 100. Method 1000 is suitable for use with the system 200 and brake assembly 100 described above and shown in FIGS. 22 to 24, but it is not so limited.

As shown in FIG. 25, the method 1000 includes the following steps, among others: a start step; a step 1002 of using the scanner to receive beacon data; a step 1004 of decoding the beacon data and identify a beacon sequence; a step 1006 of engaging a locking plate for a locking signature condition; a step 1008 of disengaging the locking plate for an unlocking signature condition; a step 1010 of collecting beacon data based on the beacon ID and the cart data based on the locking plate status; a step 1012 of generating cart usage data based on the beacon data and/or the cart data; a step 1014 of comparing the cart usage data with reference data (e.g., which may preferably include data on the historic location and/or use of the cart, historic data on the previously determined optimized usage of the cart, etc.) to generate one or more reports; a step 1016 of storing the data and the one or more reports in a database; a step 1016 of storing the beacon data, the cart data, the cart usage data and/or the one or more reports in one or more databases; and/or a step 1018 of assessing the one or more reports to optimize cart usage.

In a preferred embodiment, engagement and disengagement of the locking plate according to the method 1000 further includes a transition between the parking beacon and the fence beacon, followed by a loss of the fence beacon.

In an alternative embodiment, the method may be configured without the step 1012 of generating cart usage data based on the beacon data and/or the cart data and/or the step 1014 of comparing the cart usage data with reference data to generate one or more reports.

It will be appreciated that, according to the method 1000, the cart data 901 and/or the beacon data 903 is collected by the assembly 100. One or more components of the assembly 100 may collect the information associated with the caster 10, the cart 20, the user 30 and/or the beacon 408 that are preferably recorded as cart data 901 and/or beacon data 903 in the assembly database 104c. The processor 104a are used to automatically: collect the data 901, 903; combine and/or reconcile the data 901, 903 against one another to generate cart usage data 905; compare the cart usage data 905 against reference data 907, as applicable, and/or target value(s) for the data 901, 903; and generate one or more reports 909 which includes the collected, combined, reconciled and/or compared data 901, 903, preferably presented to the administrator. Thus, according to the invention, the method 1000 operatively facilitates the analysis of, for example, the optimal usage of a cart within a defined area.

The computer readable medium 1100, shown in FIG. 23, stores executable instructions which, upon execution, analyzes data associated with the cart 20 and/or user 30. The executable instructions include processor instructions 801a, 801b, 802a, 802b, 803a, 803b, 804a, 804b, 805a, 805b, 850a, 850b, 851a, 851b, 852a, 852b, 854a, 854b, 856a, 856b, 858a, 858b, 860a, 860b, 862a, 862b, 864a, 864b, 866a, 866b for the processors 104a, 404a to, according to a preferred embodiment of the invention, perform the aforesaid method 1000 and perform steps and provide functionality as otherwise described above and elsewhere herein. The processors 104a, 404a encoded by the computer readable medium 1100 are such as to receive data (including cart data 901 and beacon data 903), perform an analysis on the data 901, 903, generate cart usage data 905 and/or one or more reports 909 based on the analysis (e.g., including comparing the cart usage data 905 to reference data 907), and transmit the data 901, 903, 905 and/or the one or more reports 909 to the database(s) 104c, 404c. Thus, according to the invention, the computer readable medium 1100 facilitates use of the processors 104a, 404a to operatively facilitate the optimization of cart usage.

The present disclosure may be described herein with reference to system architecture, block diagrams and flowchart illustrations of methods, and computer program products according to various aspects of the present disclosure. It may be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It may also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In this disclosure, a number of terms and abbreviations may be used. The following definitions and descriptions of such terms and abbreviations are provided in greater detail.

It may be further generally understood by a person skilled in the relevant art that the term "downloading" refers to receiving datum or data to a local system from a remote system or to initiate such a datum or data transfer. Examples of a remote systems or clients from which a download might be performed include, but are not limited to, web servers, FTP servers, email servers, or other similar systems. A download can mean either any file that may be offered for downloading or that has been downloaded, or the process of receiving such a file. A person skilled in the relevant art may understand the inverse operation, namely sending of data from a local system to a remote system may be referred to as "uploading". The data and/or information used according to the present invention may be updated constantly, hourly, daily, weekly, monthly, yearly, etc. depending on the type of data and/or the level of importance inherent in, and/or assigned to, each type of data. Some of the data may preferably be downloaded from the Internet, by satellite networks or other wired or wireless networks.

Elements of the present invention may be implemented with computer systems which are well known in the art. In general, computers include a central processor, system memory, and a system bus that couples various system components including the system memory to the central processor. A system bus may be any of several types of bus structures including a memory bus or memory controller, a peripheral bus, and a local bus using any of a variety of bus architectures. The structure of a system memory may be well known to those skilled in the art and may include a basic input/output system ("BIOS") stored in a read only memory ("ROM") and one or more program modules such as operating systems, application programs and program data stored in random access memory ("RAM"). Computers may also include a variety of interface units and drives for reading and writing data. A user of the system can interact with the computer using a variety of input devices, all of which are known to a person skilled in the relevant art.

One skilled in the relevant art would appreciate that the device connections mentioned herein are for illustration purposes only and that any number of possible configurations and selection of peripheral devices could be coupled to the computer system.

Computers can operate in a networked environment using logical connections to one or more remote computers or other devices, such as a server, a router, a network personal computer, a peer device or other common network node, a wireless telephone or wireless personal digital assistant. The computer of the present invention may include a network interface that couples the system bus to a local area network ("LAN"). Networking environments are commonplace in offices, enterprise-wide computer networks and home computer systems. A wide area network ("WAN"), such as the Internet, can also be accessed by a computer, a mobile device, or the device.

It may be appreciated that the type of connections contemplated herein are exemplary and other ways of establishing a communications link between computers may be used in accordance with the present invention, including, for example, mobile devices and networks. The existence of any of various well-known protocols, such as TCP/IP, Frame Relay, Ethernet, FTP, HTTP and the like, may be presumed, and computer can be operated in a client-server configuration to permit a user to retrieve and send data to and from a web-based server. Furthermore, any of various conventional web browsers can be used to display and manipulate data in association with a web-based application. In addition, any of various mobile applications (including but not limited to iOS and Android applications) can be used to display and manipulate data.

The operation of the network ready device (i.e., a mobile device) may be controlled by a variety of different program modules, engines, etc. Examples of program modules are routines, algorithms, programs, objects, components, data structures, etc. that perform particular tasks or implement particular abstract data types. It may be understood that the present invention may also be practiced with other computer system configurations, including multiprocessor systems, microprocessor-based or programmable consumer electronics, network PCS, personal computers, minicomputers, mainframe computers, and the like. Furthermore, the invention may also be practiced in distributed computing environments where tasks are performed by remote processing devices that are linked through a communications network. In a distributed computing environment, program modules may be located in both local and remote memory storage devices.

Embodiments of the present invention can be implemented by a software program for processing data through a computer system. It may be understood by a person skilled in the relevant art that the computer system can be a personal computer, mobile device, notebook computer, server computer, mainframe, networked computer (e.g., router), workstation, processor onboard the device and the like. In one embodiment, the computer system includes a processor coupled to a bus and memory storage coupled to the bus. The memory storage can be volatile or non-volatile (i.e., transitory or non-transitory) and can include removable storage media. The computer can also include a display, provision for data input and output, etc. as may be understood by a person skilled in the relevant art.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following description, it is appreciated that throughout the present invention, references utilizing terms such as "receiving", "creating", "providing", "communicating" or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

The present invention is contemplated for use in association with one or more cooperating environments, to afford increased functionality and/or advantageous utilities in association with same. The invention, however, is not so limited.

Naturally, in view of the teachings and disclosures herein, persons having ordinary skill in the art may appreciate that alternate designs and/or embodiments of the invention may be possible (e.g., with substitution of one or more steps, algorithms, processes, features, structures, parts, components, modules, utilities, etc. for others, with alternate relations and/or configurations of steps, algorithms, processes, features, structures, parts, components, modules, utilities, etc.).

Although some of the steps, algorithms, processes, features, structures, parts, components, modules, utilities, relations, configurations, etc. according to the invention are not specifically referenced in association with one another, they may be used, and/or adapted for use, in association therewith.

One or more of the disclosed steps, algorithms, processes, features, structures, parts, components, modules, utilities, relations, configurations, and the like may be implemented in and/or by the invention, on their own, and/or without reference, regard or likewise implementation of one or more of the other disclosed steps, algorithms, processes, features, structures, parts, components, modules, utilities, relations, configurations, and the like, in various permutations and combinations, as may be readily apparent to those skilled in the art.

While computer-readable storage medium may be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

It may generally be understood by a person skilled in the relevant art that the term "cloud computing" is an information technology model that facilitates ubiquitous access to shared pools of configurable system resources and higher-level services that can be provisioned with minimal management effort, usually over the Internet. Third-party clouds preferably enable organizations to focus on their core businesses instead of allocating resources on computer infrastructure and maintenance.

The methods, components, and features described herein may be implemented by discrete hardware components or may be integrated in the functionality of other hardware components such as ASICS, FPGAs, DSPs, or similar devices. In addition, the methods, components, and features may be implemented by firmware modules or functional circuitry within hardware devices. Further, the methods, components, and features may be implemented in any combination of hardware devices and software components, or only in software.

In the present description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions.

The foregoing description has been presented for the purpose of illustration and maybe not intended to be exhaustive or to limit the invention to the precise form disclosed. Other modifications, variations and alterations are possible in light of the above teaching and may be apparent to those skilled in the art, and may be used in the design and manufacture of other embodiments according to the present invention without departing from the spirit and scope of the invention. It may be intended the scope of the invention be limited not by this description but only by the claims forming a part of this application and/or any patent issuing therefrom.

The embodiments for which an exclusive privilege or property is claimed are as follows:

1. A system for optimizing usage of a cart within a perimeter wherein the system comprises:
one or more beacons positionable within the perimeter and operable for one-way transmission of beacon data, including beacon identification and/or beacon location; and
one or more casters mountable to the cart, the one or more casters including a wheel rotatably mounted on a shaft;
a brake assembly mountable on the one or more casters of the cart, the brake assembly including:

a motion sensor configured to detect movement of the cart and to generate cart data associated with the movement of the cart;
a brake configured to arrest the motion of the cart; the brake having a locking lever to facilitate locking and unlocking the wheel in cooperation with a locking plate connectable to a first end of the shaft, the locking lever adapted to pivot about a locking lever pin between a lock position wherein the locking lever engages the locking plate to prevent rotation of the wheel, and an unlock position wherein the locking lever is disengaged from the locking plate to allow rotation of the wheel;
a scanner configured to receive the beacon data transmitted from the one or more beacons; and
a brake assembly processor operable to: (i) automatically apply a beacon algorithm to decode the beacon data; (ii) using the decoded beacon data to identify the beacon sequence as a locking signature condition or an unlocking signature condition and/or determine the location of the cart within the perimeter; and/or (iii) electronically receive and/or transmit the cart data and the beacon data;
whereby the system is operable to optimize the usage of the cart by engaging the brake if the decoded beacon data is identified as the locking signature condition or disengaging the brake if the decoded beacon data is identified as the unlocking signature condition.

2. The system of claim 1, further comprising one or more administrator processors operable to: (i) electronically receive the cart data and the beacon data from the brake assembly processor; (ii) automatically apply a motion detection and cart usage algorithm to the cart data and the beacon data to generate cart usage data and/or one or more reports associated with the cart; whereby the system is operable to optimize the usage of the cart based on a review of the cart usage data and/or the one or more reports associated with the cart.

3. The system of claim 2, further comprising one or more databases for electronically storing the cart data, the beacon data, the cart usage data and the one or more reports associated with the cart.

4. The system of claim 3, wherein the motion sensor is adapted to activate a power-saving mode for the brake assembly if the cart is stationary for a predetermined amount of time.

5. The system of claim 4, wherein the motion sensor is one of an accelerometer and a wheel rotation counter.

6. The system of claim 5, wherein the system further comprises a mobile application adapted to engage and/or disengage the brake independent of the decoded beacon data.

7. The system of claim 2, wherein the reports include mileage history of the cart, lock history of the cart, consumer behaviour, battery voltage, and/or scanner status.

8. The system of claim 1, wherein the brake further comprises a cam, rotatable between a cam engagement position and a cam disengagement position, and a motor adapted to rotate the cam between the cam engagement position and the cam disengagement position, such that when the locking signature condition is identified, the motor rotates the cam to the disengagement position to disengage the cam from the locking lever to pivot the lever to the lock position, and when the unlocking signature condition is identified, the motor rotates the cam to the engagement position to engage the cam with the locking lever to pivot the lever to the unlock position.

9. The system of claim 8, wherein the locking plate has a depression for receiving the locking plate engagement end of the lever to prevent further rotation of the locking plate in the lock position.

10. The system of claim 9, wherein the brake further comprises a resilient member for urging the locking lever into the lock position when the cam is in the disengagement position.

11. The system of claim 10, wherein the identification of the locking signature condition and the unlocking signature condition includes the use of at least one of signal strength information, signal strength variation and/or transition state detection.

12. A brake assembly for arresting the motion of a cart having one or more casters, each of the one or more casters having a wheel rotatably mounted on a shaft and the shaft supported by a fork pivotably connected to the cart, the brake assembly mountable on the fork of at least one of the one or more casters and comprising:

a housing;

one or more electronic components;

a locking plate connectable to a first end of the shaft;

a bearing housing mountable on a side of the fork opposite the housing and adapted to rotatably receive a second end of the shaft;

a cam mounted on a portion of the housing and rotatable between a cam engagement position and a cam disengagement position;

a motor adapted to rotate the cam between the cam engagement position and the cam disengagement position;

a locking lever to facilitate locking and unlocking the wheel in cooperation with the cam and the locking plate, the locking lever adapted to pivot about a locking lever pin mounted to the housing between a lock position, such that a locking plate engagement end of the lever engages the locking plate to prevent rotation of the wheel, and an unlock position such that the locking plate engagement end of the lever disengages the locking plate to allow rotation of the wheel;

wherein when the one or more electronic components identify a locking signature condition, the motor rotates the cam to the disengagement position such that the cam is disengaged from the locking lever to pivot the lever to the lock position to prevent rotation of the wheel, and when the one or more electronic components identify an unlocking signature condition, the motor rotates the cam to the engagement position such that the cam engages the locking lever to pivot the lever to the unlock position to allow rotation of the wheel.

13. The brake assembly of claim 12, wherein the locking plate has a depression for receiving the locking plate engagement end of the lever to prevent further rotation of the locking plate in the lock position.

14. The brake assembly of claim 13, further comprising a resilient member for urging the locking lever into the lock position when the cam is in the disengagement position.

15. The brake assembly of claim 14, further comprising a limit switch to define the limit of travel of the cam between the cam engagement position and the cam disengagement position.

16. The brake assembly of claim 12, wherein the one or more electronic components comprises a motion sensor for detecting movement of the cart and generating cart data associated with the movement of the cart.

17. The brake assembly of claim 16, wherein the motion sensor $1s$ one of an accelerometer and a wheel rotation counter.

18. The brake assembly of claim 17, wherein the one or more electronic components comprises a scanner for locating a beacon.

19. The brake assembly of claim 18, wherein the one of more electronic components further comprises a processor operable to automatically apply a beacon algorithm to identify a beacon sequence and determine the locking signature condition or the unlocking signature condition.

20. A method of optimizing usage of a cart within a perimeter, the cart having one or more casters, wherein the method comprises the steps of:

(a) positioning one or more beacons within the perimeter, the one or more beacons operable for one-way transmission of beacon data, including beacon identification and/or beacon location;

(b) providing a brake assembly mountable on the one or more casters of the cart, the brake assembly including: a motion sensor; a brake; a scanner; and a brake assembly processor;

(c) detecting movement of the cart to generate cart data using the motion sensor;

(d) activating the scanner when movement of the cart is detected;

(e) receiving the beacon data transmitted by the one or more beacons;

(f) decoding the beacon data using a brake assembly processor operable to apply a beacon algorithm to the beacon data and use the decoded beacon data to identify a beacon sequence and determine a locking signature condition or an unlocking signature condition;

(g) electronically receiving and/or transmitting the cart data and the beacon data; and (h) engaging the brake if the decoded beacon data is identified as the locking signature condition or disengaging the brake if the decoded beacon data is identified as the unlocking signature condition.

21. The method of claim 20 further comprising the steps of: (i) operating one or more administrator processors to electronically receive the cart data and the beacon data from the brake assembly processor; (ii) automatically applying a motion detection and cart usage algorithm to the cart data and the beacon data using the one or more administrator processors to generate cart usage data and/or one or more reports associated with the cart; and reviewing the cart usage data and/or the one or more reports associated with the cart to optimize the usage of the cart.

22. The method of claim 21, further comprising a step of electronically storing the cart data, the beacon data, the cart usage data and the one or more reports associated with the cart in one or more databases.

23. The method of claim 22, further comprising a step of activating a power-saving mode for the brake assembly if the motion sensor determines that the cart is stationary for a predetermined amount of time.

24. The method of claim 23, whereby the operation of the brake further comprises the steps of: (i) pivoting a locking lever having a locking plate engagement end, about a locking lever pin, between a lock position and an unlock position; and (ii) engaging the locking plate engagement end with a locking plate connectable to a wheel to prevent rotation of the wheel when the locking lever is in the lock position and disengaging the locking plate engagement end from the locking plate to allow rotation of the wheel when the locking lever is in the unlock position.

25. The method of claim 24, whereby the operation of the brake further comprises the steps of:

(i) rotating a cam between a cam engagement position to engage the cam with the locking lever to pivot the lever to the unlock position and a cam disengagement position to disengage the cam from the locking lever to pivot the lever to the lock position;

(ii) operating a motor to rotate the cam between the cam engagement position and the cam disengagement position; and (iii) rotating the cam to the disengagement position when the locking signature condition is identified and to the engagement position when the unlocking signature condition is identified.

26. A system for optimizing usage of a cart within a perimeter, the cart having one or more casters, the one or more casters including a wheel rotatably mounted on a shaft, wherein the system comprises:

one or more beacons positionable within the perimeter and operable for one-way transmission of beacon data, including beacon identification and/or beacon location; and a brake assembly mountable on the one or more casters of the cart, the brake assembly including:

a brake configured to arrest the motion of the cart; the brake having a locking lever to facilitate locking and unlocking the wheel in cooperation with a locking plate connectable to a first end of the shaft, the locking lever adapted to pivot about a locking lever pin between a lock position wherein the locking lever engages the locking plate to prevent rotation of the wheel, and an unlock position wherein the locking lever is disengaged from the locking plate to allow rotation of the wheel;

and a brake assembly processor operable to: (i) receive the beacon data transmitted from the one or more beacons; (ii) automatically apply a beacon algorithm to decode the beacon data; and/or (iii) use the decoded beacon data to identify the beacon sequence as a locking signature condition or an unlocking signature condition and/or determine the location of the cart within the perimeter;

whereby the system is operable to optimize the usage of the cart by engaging the brake if the decoded beacon data is identified as the locking signature condition or disengaging the brake if the decoded beacon data is identified as the unlocking signature condition.

* * * * *